United States Patent
Naito

(10) Patent No.: US 8,300,939 B2
(45) Date of Patent: Oct. 30, 2012

(54) IMAGE PROCESSING METHOD, IMAGE PROCESSING APPARATUS, AND PROGRAM

(75) Inventor: Satoshi Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 12/836,011

(22) Filed: Jul. 14, 2010

(65) Prior Publication Data

US 2011/0019928 A1 Jan. 27, 2011

(30) Foreign Application Priority Data

Jul. 27, 2009 (JP) ................................. 2009-174736

(51) Int. Cl.
*G06K 9/34* (2006.01)
(52) U.S. Cl. ....................................... 382/177; 382/225
(58) Field of Classification Search .................. 382/173, 382/177, 187, 225; 356/462
See application file for complete search history.

(56) References Cited

U.S. PATENT DOCUMENTS

| | | | | |
|---|---|---|---|---|
| 5,647,021 A * | 7/1997 | Baird et al. | .................... | 382/176 |
| 5,680,478 A * | 10/1997 | Wang et al. | .................... | 382/176 |
| 5,767,978 A * | 6/1998 | Revankar et al. | ............. | 358/296 |
| 5,999,647 A * | 12/1999 | Nakao et al. | .................. | 382/187 |
| 6,701,010 B1 | 3/2004 | Katsuyama | | |
| 6,990,235 B2 | 1/2006 | Katsuyama | | |
| 7,623,712 B2 | 11/2009 | Dai et al. | | |
| 7,630,544 B1* | 12/2009 | Zhou | ............................. | 382/164 |
| 2007/0025617 A1* | 2/2007 | Dai et al. | ...................... | 382/180 |
| 2007/0086667 A1* | 4/2007 | Dai et al. | ...................... | 382/242 |
| 2010/0033745 A1 | 2/2010 | Dai et al. | | |

FOREIGN PATENT DOCUMENTS

| | | |
|---|---|---|
| JP | 11-288465 A | 10/1999 |
| JP | 2006-344069 A | 12/2006 |
| JP | 2007-158725 A | 6/2007 |
| JP | 2008-206073 A | 9/2008 |

* cited by examiner

*Primary Examiner* — Samir Ahmed

(74) *Attorney, Agent, or Firm* — Fitzpatrick, Cella, Harper & Scinto

(57) ABSTRACT

Every time clustering processing for a predetermined number of pixels is complete, a small cluster having the number of allocated pixels, which is equal to or smaller than a pixel count threshold, is discriminated. The small cluster, which is discriminated to have the number of allocated pixels equal to or smaller than the pixel count threshold, is merged to a cluster having the nearest representative feature vector. With this arrangement, the number of clusters which are to undergo distance calculations of feature vectors is reduced. According to this arrangement, region segmentation of an image can be executed faster by the clustering processing.

15 Claims, 15 Drawing Sheets

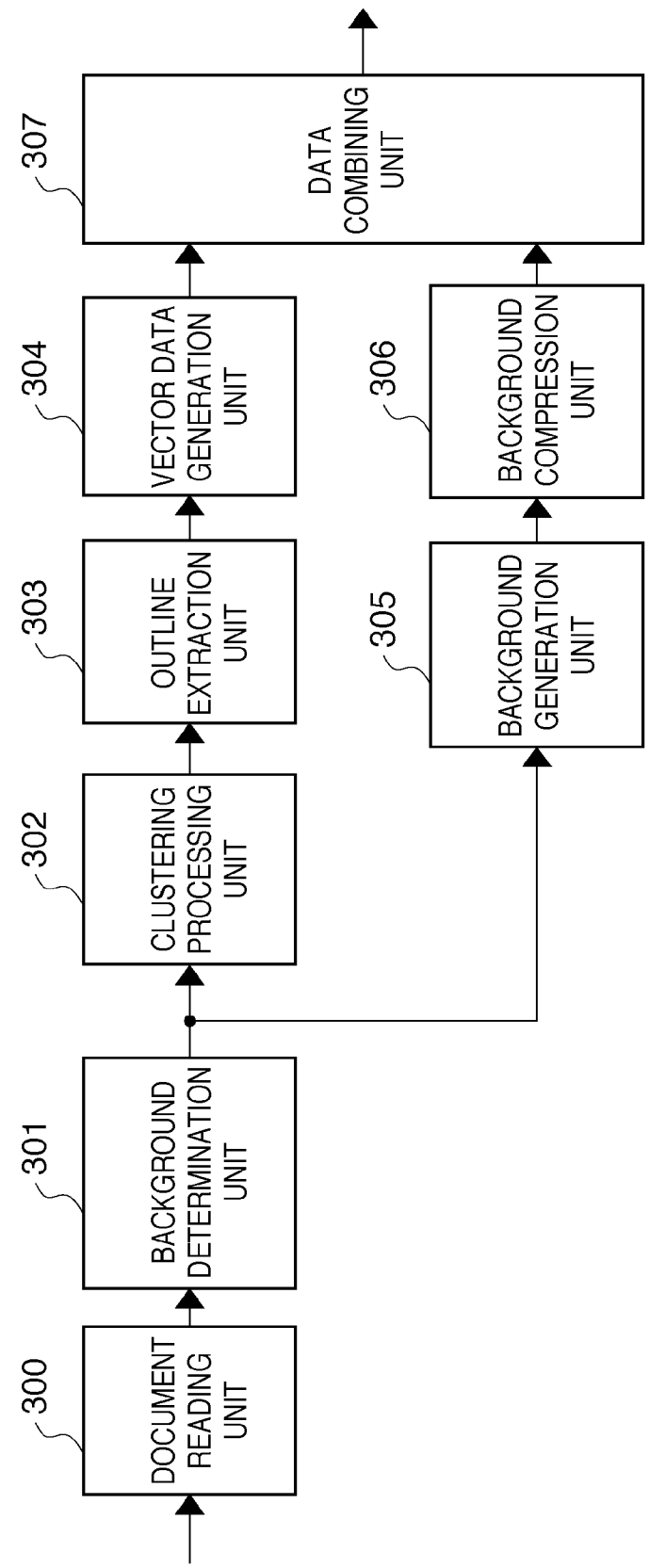

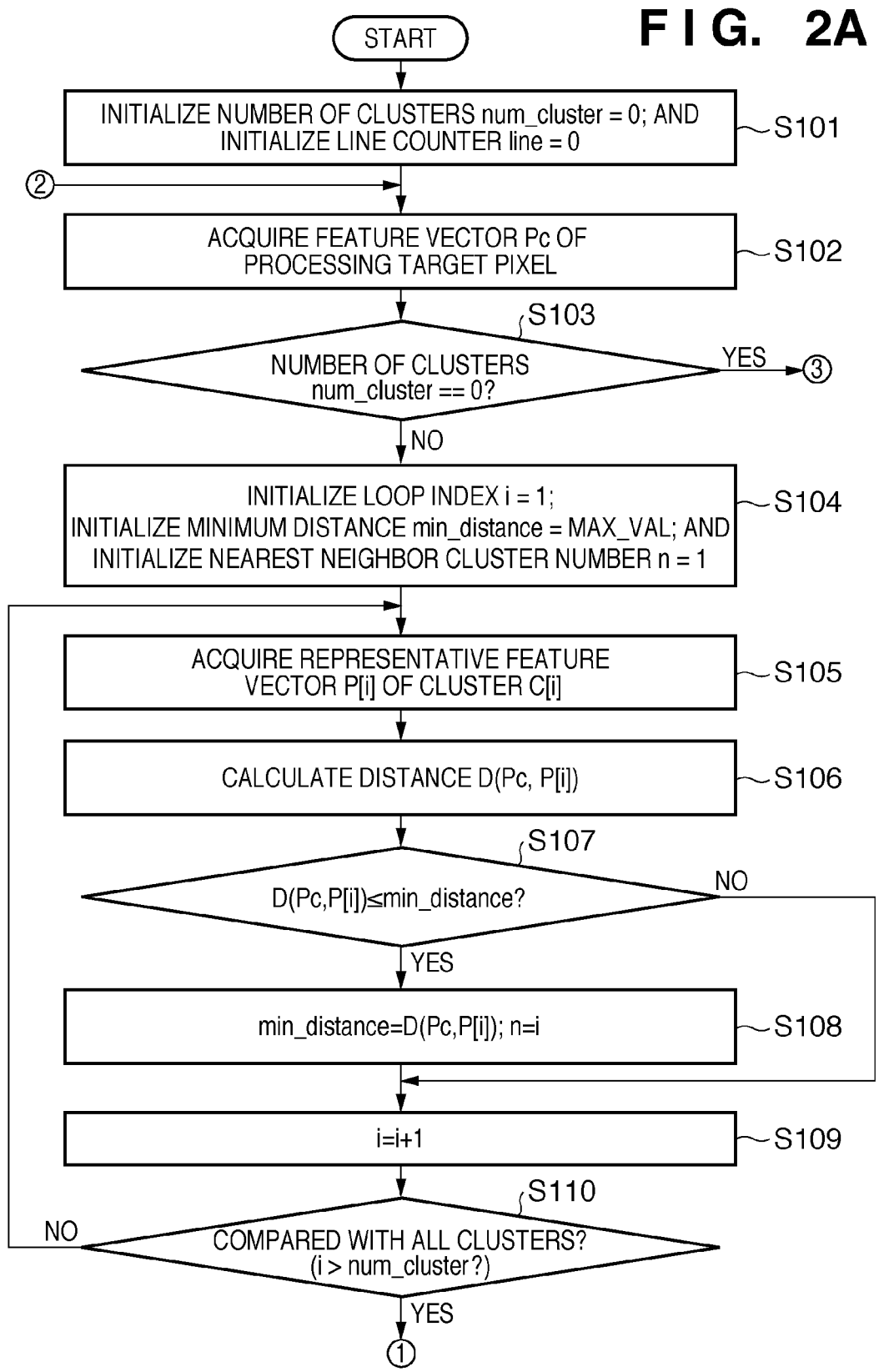

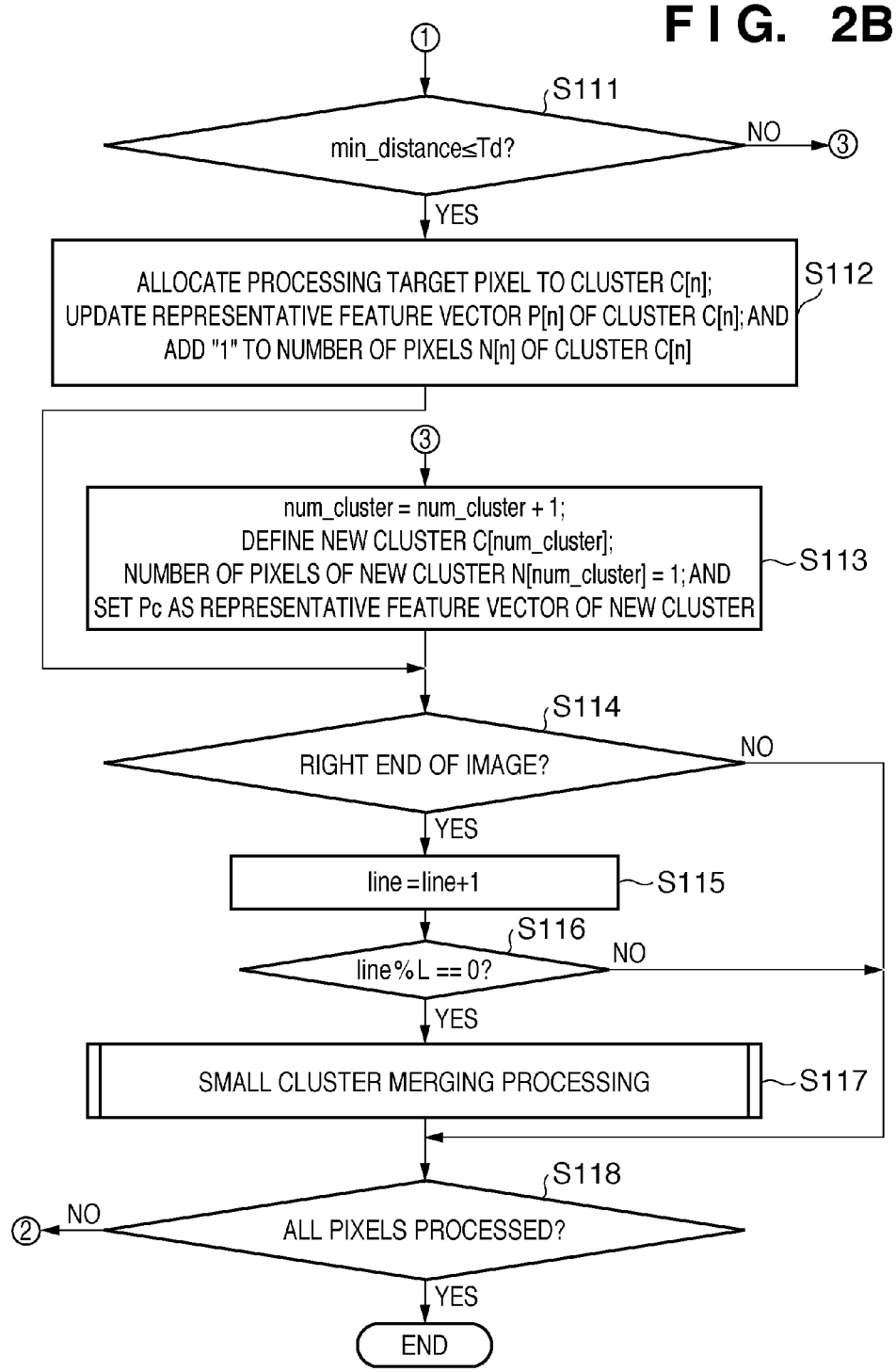

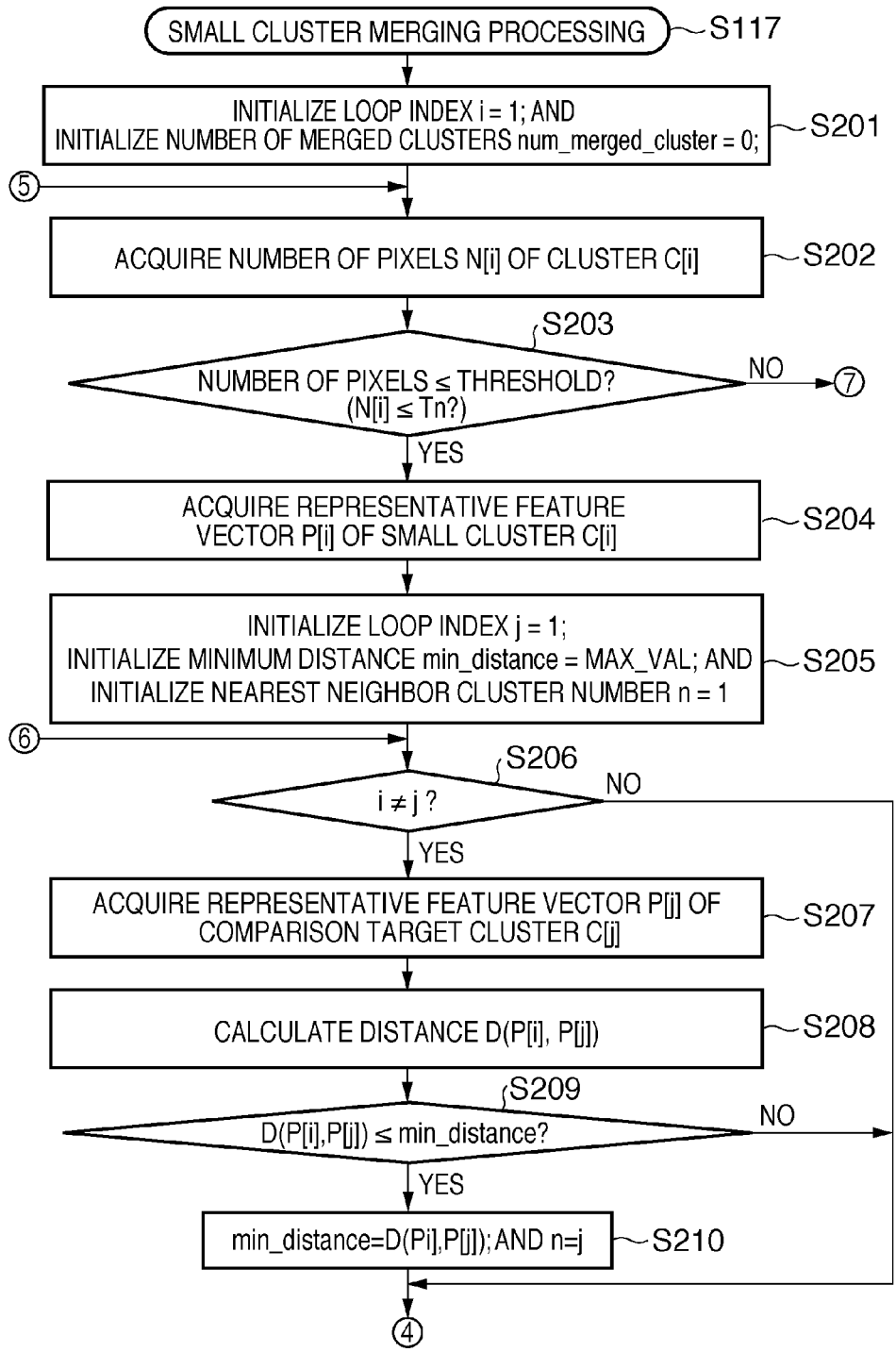

☐ REGION#1  ▨ REGION#2  ☰ REGION#3  ▨ REGION#4

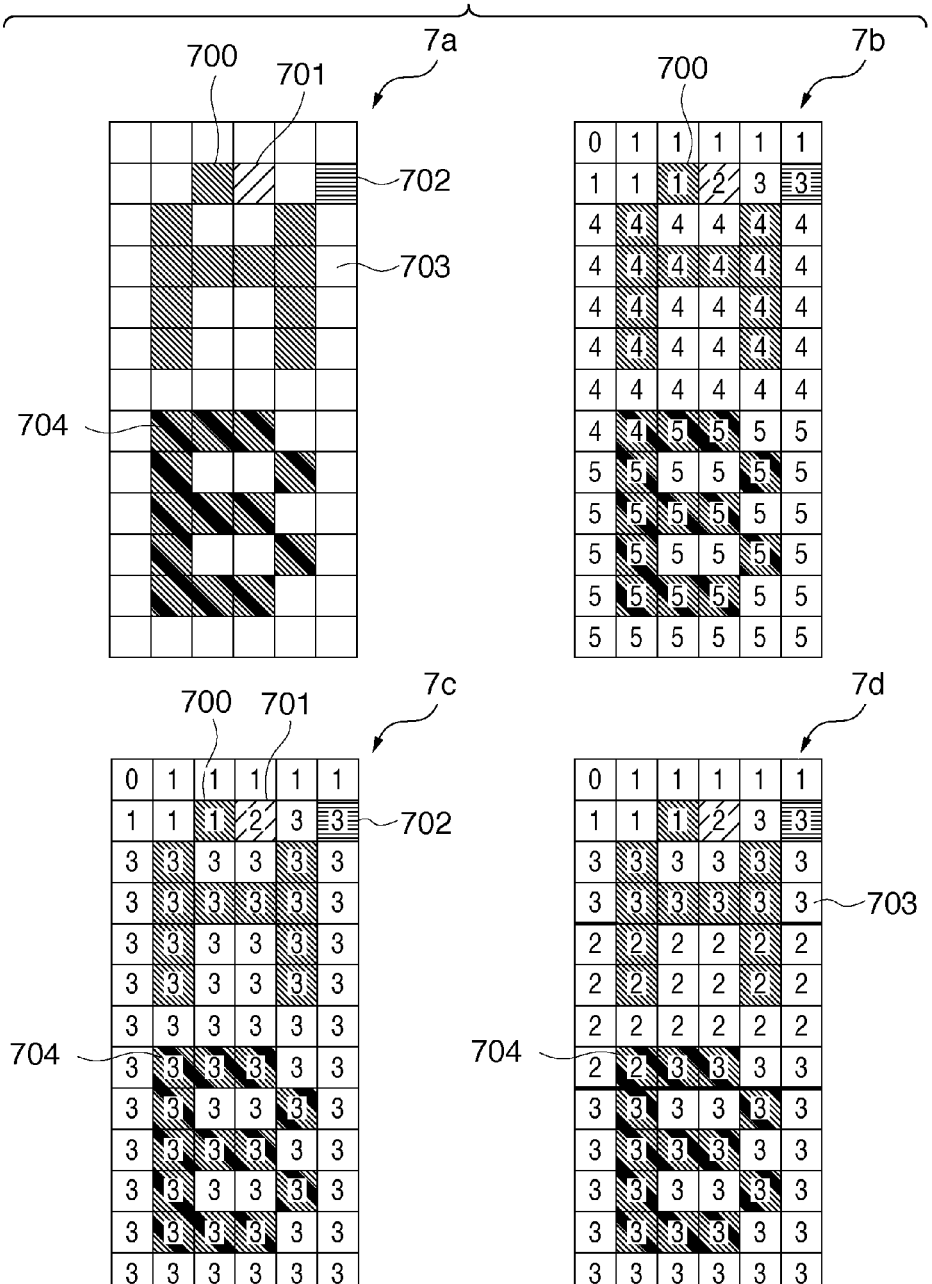

IMAGE PROCESSING METHOD, IMAGE PROCESSING APPARATUS, AND PROGRAM

BACKGROUND OF THE INVENTION

1. Field of the Invention

The present invention relates to an image processing method, image processing apparatus, and program, which process an image by segmenting it into regions.

2. Description of the Related Art

There is a growing demand to digitize documents and save or send digital document data in place of paper. Document digitization in this case is not limited to processing for simply scanning a document on paper using, for example, a scanner to obtain image data. For example, image data is segmented into regions having different properties such as text, graphic, photo, and table, which configure a document. Then, the document digitization processing executes processing for converting these regions into most suited formats, for example, a text region into character codes, a graphic region into vector data, a background region and photo region into bitmap data, and a table region into structure data. As a conversion method into vector data, an image processing apparatus of Japanese Patent Laid-Open No. 2007-158725 has been disclosed. This image processing apparatus implements region segmentation by clustering processing to extract outlines of respective regions, and to convert the extracted outlines into vector data. Japanese Patent Laid-Open No. 2008-206073 discloses an image processing method which separates an image into a background and foreground, converts the foreground into vector data, and compresses data of the background by a background dedicated method. Also, Japanese Patent Laid-Open No. 2006-344069 discloses an image processing method which removes a noise included in a document image, which is scanned by a scanner and then undergoes clustering processing.

As a method of segmenting an image into regions by clustering processing, a Nearest Neighbor clustering method is known. The Nearest Neighbor clustering method compares a feature vector of a processing target pixel with representative feature vectors of respective clusters to search for a cluster having the nearest representative feature vector. When the distance is equal to or smaller than a predetermined threshold, the processing target pixel is allocated to the corresponding cluster. Otherwise, a new cluster is defined to allocate the processing target pixel to that cluster. Note that color information (a pixel value including R, G, and B values) is generally used as a feature vector. As the representative feature vector of each cluster, a centroid of that cluster is generally used. That is, an average value of feature vectors (color information) of pixels allocated to each cluster is used. The Nearest Neighbor clustering method executes processing for searching all clusters for a cluster having the nearest representative feature vector to the feature vector of the processing target pixel. That is, this method has to calculate distances from representative feature vectors of all clusters for each pixel. For this reason, a longer calculation time is required with increasing number of clusters to enhance the accuracy of region segmentation.

As a related art that can solve this problem, Japanese Patent Laid-Open No. 11-288465 has disclosed a color image processing apparatus. Japanese Patent Laid-Open No. 11-288465 executes clustering based on feature vectors (color information) of a processing target pixel and adjacent pixels. Then, clusters undergo grouping based on color information and geometry information of clusters. Note that the geometry information includes, for example, coordinate information indicating a distance between regions.

However, with the related art of Japanese Patent Laid-Open No. 11-288465, when distances between feature vectors of the processing target pixel and adjacent pixels are large, a new cluster is defined, and the pixel of interest is allocated to the newly defined cluster. As a result, a large number of clusters are defined. For this reason, a processing time required for grouping is increased. Also, with the related art of Japanese Patent Laid-Open No. 2006-344069, noise removal processing is executed after completion of clustering processing for the entire target image. Therefore, during the clustering processing, representative feature vectors of clusters including noise components to be removed also undergo distance calculations with the processing target pixel, thus increasing a processing time.

SUMMARY OF THE INVENTION

Hence, the present invention provides an image processing method, image processing apparatus, and program, which can quickly segment an image into regions by clustering processing.

In order to solve the aforementioned problems, the present invention provides a method of processing an image by segmenting the image into a plurality of clusters is provided. The method comprises: a cluster generation step of allocating, when a distance between a feature vector of a processing target pixel which is selected from the image sequentially and a representative feature vector of a cluster which has the nearest representative feature vector to the feature vector of the processing target pixel in a plurality of pre-defined clusters is not more than a first distance threshold, the processing target pixel to the cluster which has the nearest representative feature vector to the feature vector of the processing target pixel in the plurality of pre-defined clusters, while, when the distance between the feature vector of the processing target pixel and the representative feature vector of the cluster which has the nearest representative feature vector to the feature vector of the processing target pixel in the plurality of pre-defined clusters is more than the first distance threshold, defining a new cluster and allocating the processing target pixel to the new defined cluster; and a cluster merging step of merging, every after processes in the cluster generation step have been performed on a predetermined number of processing target pixels, a small cluster to a cluster having the nearest representative feature vector to a representative feature vector of the small cluster in the plurality of pre-defined clusters, wherein the small cluster is a cluster of which a number of allocated pixels is not more than a pixel count threshold.

The present invention also provides a computer-readable storage medium which stores a program causing a computer to serve as: a cluster generation unit configured to allocate, when a distance between a feature vector of a processing target pixel which is selected from the image sequentially and a representative feature vector of a cluster which has the nearest representative feature vector to the feature vector of the processing target pixel in a plurality of pre-defined clusters is not more than a first distance threshold, the processing target pixel to the cluster which has the nearest representative feature vector to the feature vector of the processing target pixel in the plurality of pre-defined clusters, while to define, when the distance between the feature vector of the processing target pixel and the representative feature vector of the cluster which has the nearest representative feature vector to the feature vector of the processing target pixel in the plurality of pre-defined clusters is more than the first distance threshold, a new cluster and to allocate the processing target pixel to the new defined cluster; and a cluster merging unit configured to merge, every after processes of the cluster generation unit have been performed on a predetermined number of processing target pixels, a small cluster to a cluster having the nearest representative feature vector to a representative feature vector of the small cluster in the plurality of pre-defined clusters, wherein the small cluster is a cluster of which a number of allocated pixels is not more than a pixel count threshold.

The present invention further provides an image processing apparatus for processing an image by segmenting the image into a plurality of clusters. The apparatus comprises: a cluster generation unit configured to allocate, when a distance between a feature vector of a processing target pixel which is selected from the image sequentially and a representative feature vector of a cluster which has the nearest representative feature vector to the feature vector of the processing target pixel in a plurality of pre-defined clusters is not more than a first distance threshold, the processing target pixel to the cluster which has the nearest representative feature vector to the feature vector of the processing target pixel in the plurality of pre-defined clusters, while to define, when the distance between the feature vector of the processing target pixel and the representative feature vector of the cluster which has the nearest representative feature vector to the feature vector of the processing target pixel in the plurality of pre-defined clusters is more than the first distance threshold, a new cluster and to allocate the processing target pixel to the new defined cluster; and a cluster merging unit configured to merge, every after processes of the cluster generation unit have been performed on a predetermined number of processing target pixels, a small cluster to a cluster having the nearest representative feature vector to a representative feature vector of the small cluster in the plurality of pre-defined clusters, wherein the small cluster is a cluster of which a number of allocated pixels is not more than a pixel count threshold.

According to the resent invention, processing for merging small clusters each having the number of allocated pixels, which is equal to or smaller than a pixel count threshold, to a cluster having a smaller distance between their representative feature vectors is executed every time clustering processing is executed for a predetermined number of pixels. Therefore, since the total number of comparison target clusters for a feature vector of each pixel is decreased, a number of distance calculations can be reduced compared to the related arts, thus allowing faster region segmentation.

Further features of the present invention will become apparent from the following description of exemplary embodiments with reference to the attached drawings.

BRIEF DESCRIPTION OF THE DRAWINGS

FIG. 1A is a block diagram showing an example of the functional arrangement of an image processing apparatus to which an image processing method according to an embodiment of the present invention is applied;

FIGS. 2A and 2B are flowcharts exemplifying a practical processing sequence of an image processing method according to the first embodiment;

FIGS. 3A and 3B are flowcharts exemplifying a processing sequence for merging small clusters in the image processing method according to the first embodiment;

FIG. 7 is a view exemplifying the numbers of distance calculations in the image processing method according to the second embodiment;

DETAILED DESCRIPTION OF THE EMBODIMENTS

Figure 1B:
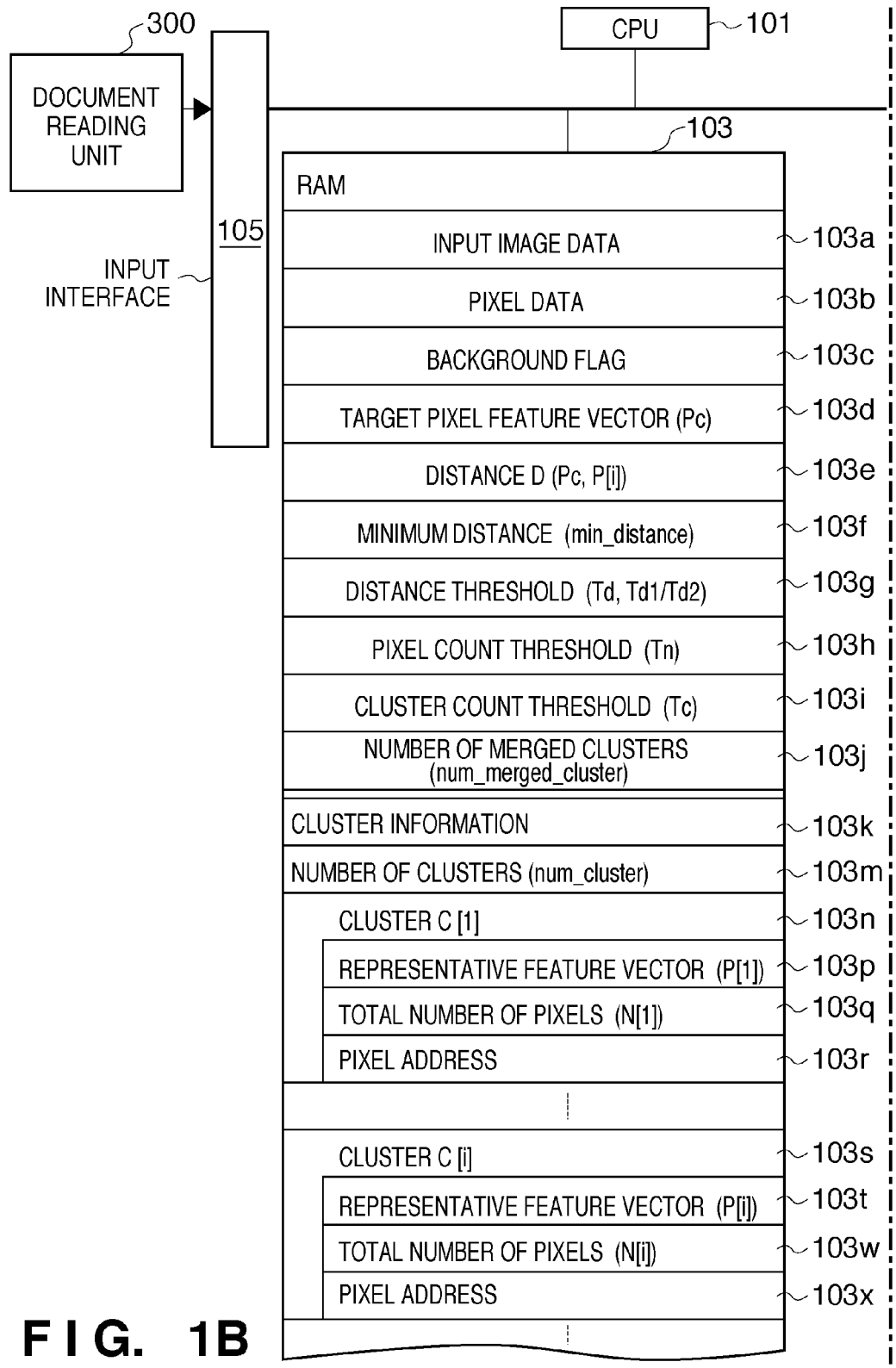
FIGS. 1B and 1C are block diagrams showing an example of the hardware arrangement of the image processing apparatus according to the embodiment.

<Arrangement Example of Image Processing Apparatus of This Embodiment>

(Functional Arrangement Example of Image Processing Apparatus)

An example of the functional arrangement of an image processing apparatus which also serves as a vector data conversion apparatus using an image processing method of this embodiment will be described below with reference to the block diagram shown in FIG. 1A. Referring to FIG. 1A, reference numeral 300 denotes a document reading unit which reads a document. More specifically, the document reading unit 300 optically reads a document image using a scanner, A/D-converts the read image, and outputs image data. Reference numeral 301 denotes a background determination unit, which determines whether each pixel represented by the image data output from the document reading unit 300 is included in a foreground or background, and outputs the image data and a background flag indicating that the pixel is included in the background for each pixel. The background determination method is given in Japanese Patent Laid-Open No. 2008-206073 described above. For example, in case of image data optically read by the scanner, a paper color may be discriminated, and background pixels may be determined based on that color. Reference numeral 302 denotes a clustering processing unit, which segments image data into regions by applying the image processing method of this embodiment. To the clustering processing unit 302, image data output from the background determination unit 301 are input pixel by pixel in a raster-scan order. The clustering processing unit 302 outputs image data (data of respective cluster regions) after region segmentation (clustering processing). In this embodiment, the clustering processing unit 302 merges a cluster having a small number of allocated pixels to another cluster every time it processes pixels for L lines. Note that the value of the number L of lines is not limited in the present invention. In this embodiment, assume that L="4". Reference numeral 303 denotes an outline extraction unit, which extracts outlines of respective regions (clusters) segmented by the clustering processing unit 302. Reference numeral 304 denotes a vector data generation unit, which generates vector data based on the outlines extracted by the outline extraction unit 303. The vector data generation unit 304 converts only foreground image data into vector data. Reference numeral 305 denotes a background generation unit which fills pixels other than the background of the image data with a background color based on the background flags output from the background determination unit 301, and outputs them. Reference numeral 306 denotes a background compression unit, which compresses data output from the background generation unit 305. As the processing method used in compression by the background compression unit 306, a JPEG encoding method is available. However, the present invention is not limited to such specific method. Reference numeral 307 denotes a data combining unit which combines the vector data output from the vector data generation unit 304 and the compressed data output from the background compression unit 306, and outputs a file.

(Hardware Arrangement Example of Image Processing Apparatus)

Figure 1C:
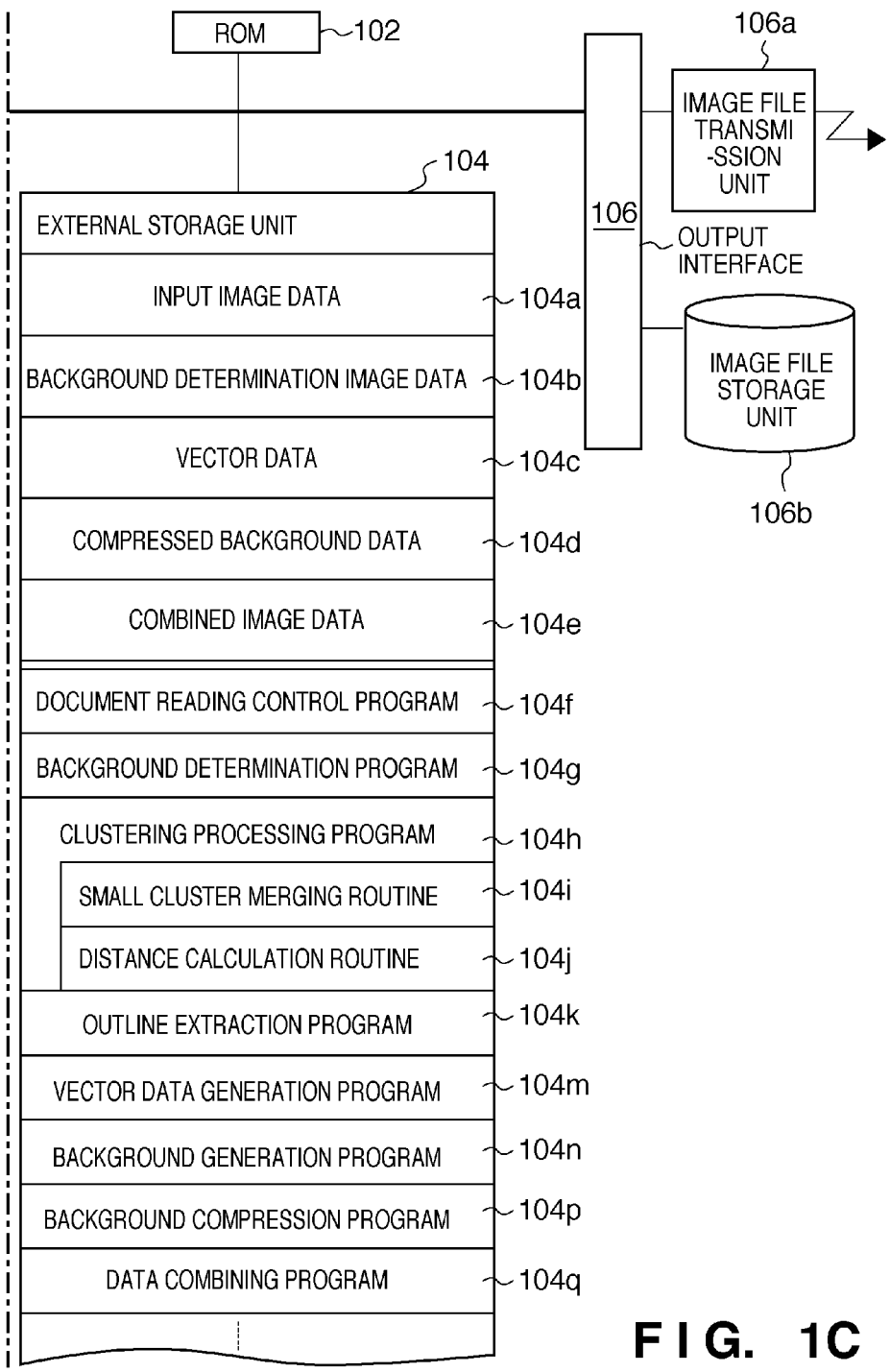

An example of the hardware arrangement which implements the image processing apparatus of this embodiment by a computer will be described below with reference to FIGS. 1B and 1C. Referring to FIGS. 1B and 1C, reference numeral 101 denotes a CPU which performs calculations and control that implement respective units of the image processing apparatus according to programs. Reference numeral 102 denotes a ROM which stores permanent programs such as a boot program, and data.

Reference numeral 103 denotes a RAM which is used as a temporary storage while the CPU 101 executes programs. In this example, on the RAM 103, areas for storing the following data are assured. Reference numeral 103a denotes an area for storing input image data read by the document reading unit 300. Reference numeral 103b denotes an area for storing processing target pixel data of this embodiment. Reference numeral 103c denotes an area for storing the background flag indicating whether the pixel data 103b is included in the background or foreground. Reference numeral 103d denotes an area for storing a feature vector (Pc) of the target pixel. Reference numeral 103e denotes an area for storing distances D(Pc, P[i]) between feature vectors, which indicate their similarity and are calculated from the feature vector (Pc) of the target pixel and representative feature vectors (P[i]) of respective clusters C[i]. Reference numeral 103f denotes an area for storing a minimum distance (min_distance) of the distances D(Pc, P[i]). Reference numeral 103g denotes an area for storing a distance threshold (Td, Td1/Td2) used to determine whether or not to merge small clusters based on the minimum distance (min_distance). Reference numeral 103h denotes an area for storing a pixel count threshold (Tn) used to discriminate a small cluster including a small number of pixels. Reference numeral 103i denotes an area for storing a cluster count threshold (Tc) used to limit the total number of clusters. Reference numeral 103j denotes an area for storing the number of small clusters (num_merged_cluster) merged by the processing of this embodiment. An area 103k and subsequent areas are used to store generated cluster information. Reference numeral 103m denotes an area for storing the current total number of clusters (num_cluster). Reference numeral 103n denotes an area for storing information of the first cluster C[1]. Reference numeral 103p denotes an area for storing a representative feature vector (P[1]) of the cluster C[1]. Reference numeral 103q denotes an area for storing the total number of pixels (N[1]) included in the cluster C[1]. Reference numeral 103r denotes an area for storing, for example, addresses used to specify pixels included in the cluster C[1]. Reference numeral 103s denotes an area for storing information of the i-th cluster C[i]. Reference numeral 103t denotes an area for storing a representative feature vector (P[i]) of the cluster C[i]. Reference numeral 103w denotes an area for storing the total number of pixels (N[i]) included in the cluster C[i]. Reference numeral 103x denotes an area for storing, for example, addresses used to specify pixels included in the cluster C[i]. Note that a variable n that substitutes loop indices i and j, or the like, which is used in the following flowcharts is not shown in FIG. 1B for the sake of simplicity.

Reference numeral 104 denotes an external storage unit such as a disk which stores programs executed by the CPU 101 and large-size data in a nonvolatile manner. In this example, on the external storage unit 104, areas for storing the following data and programs are assured. Reference numeral 104a denotes an area for storing input image data read by the document reading unit 300. Reference numeral 104b denotes an area for storing background determination image data as a pair of each pixel data and a background flag, which are output from the background determination unit 301. Reference numeral 104c denotes an area for storing vector data which is generated by the vector data generation unit 304 and represents outlines of clusters extracted by the outline extraction unit 303. Reference numeral 104d denotes an area for storing compressed background data which is generated by the background generation unit 305 and is compressed by the background compression unit 306. Reference numeral 104e denotes an area for storing combined image data which is generated by the data combining unit 307 by combining the vector data and compressed background data. An area 104f and subsequent areas store programs which are to be executed by the CPU 101 and indicate the processing sequences of this embodiment. When the CPU 101 executes the following programs, processes of the respective functional elements shown in FIG. 1A are implemented. Reference numeral 104f denotes an area for storing a document reading control program used to control the document reading processing by the document recording unit 300. Reference numeral 104g denotes an area for storing a background determination program used to determine whether each pixel is included in the background or foreground. Reference numeral 104h denotes an area for storing a clustering processing program used to control clustering unique to this embodiment, as shown in FIGS. 2A and 2B, FIGS. 6A and 6B, and FIGS. 8A and 8B to be described later. The clustering processing program includes a small cluster merging routine 104i to be described later using FIGS. 3A and 3B, and a distance calculation routine 104j used to calculate a distance between a feature vector of the target pixel and a representative feature vector of each cluster. Reference numeral 104k denotes an area for storing an outline extraction program used to extract outlines of clusters. Reference numeral 104m denotes an area for storing a vector data generation program used to generate vector data from the extracted outlines of clusters. Reference numeral 104n denotes an area for storing a background generation program used to generate background data based on the background flags of respective pixels. Reference numeral 104p denotes an area for storing a background compression program used to compress the generated background data. Reference numeral 104q denotes an area for storing a data combining program used to generate combined image data by combining the vector data and compressed background data.

Reference numeral 105 denotes an input interface used to receive external data. In this embodiment, the input interface 105 receives image data from the aforementioned document reading unit 300. Reference numeral 106 denotes an output interface used to output an image file processed by the image processing apparatus. To the output interface 106, for example, an image file transmission unit 106a which transmits the generated image file to an external apparatus, and an image file storage unit 106b which stores the generated image file are connected.

[First Embodiment]

<Processing Sequence Example of Clustering Processing Unit 302 of First Embodiment>

A processing example of the first embodiment in which the clustering processing unit 302 in the image processing apparatus of this embodiment generates a plurality of clusters will be described in detail below using the flowcharts exemplified in FIGS. 2A and 2B. The CPU 101 initializes, to zero, a variable "num_cluster" that represents the number of clusters, and a variable "line" that represents a line (vertical coordinate) where a pixel which is to undergo clustering processing (to be referred to as a processing target pixel hereinafter) is located (S101). The CPU 101 then acquires a feature vector Pc of the processing target pixel (S102). In this embodiment, assume that the processing target is selected in turn from an upper left pixel. Note that the image processing method of this embodiment uses a pixel value on an RGB color space as a feature vector (feature amount). However, the present invention is not limited to such specific value. For example, a pixel value on a YCC color space may be used, or coordinate information of a pixel may be used as a feature vector in addition to the pixel value. Also, a feature vector which represents each cluster will be referred to as a representative feature vector. In this embodiment, assume that an average value of feature vectors of pixels allocated to each cluster is used as the representative feature vector of that cluster. The CPU 101 then determines whether or not the number of clusters is zero (S103). If the number of clusters is zero (YES in S103), the CPU 101 proceeds the process to step S113. If the number of clusters is not zero (NO in S103), the CPU 101 proceeds the process to step S104.

Steps S104 to 5110 are processes for searching defined clusters C[1] to C[num_cluster] for a cluster having the nearest representative feature vector to the feature vector of the processing target pixel. In step S104, the CPU 101 initializes a loop index i. The CPU 101 initializes, by a constant MAX_VAL, a variable "min_distance" which represents a minimum one of distances between the feature vector of the processing target pixel and representative feature vectors of respective clusters. Note that a value larger than a maximum distance that can be assumed on a feature space (color information) is set as the constant MAX_VAL. Furthermore, the CPU 101 initializes a variable n that represents a number of a cluster nearest to the feature vector of the processing target pixel to "1". Then, the CPU 101 acquires a representative feature vector P[i] of a cluster C[i] (S105). The CPU 101 calculates a distance D(Pc, P[i]) between the feature vector Pc of the processing target pixel and the representative feature vector P[i] of the cluster C[i] (S106), and compares the calculated distance with the variable "min_distance" (S107). If the distance D(Pc, P[i]) is equal to or smaller than the variable "min_distance" (YES in S107), the CPU 101 substitutes the distance D(Pc, P[i]) calculated in step S106 in "min_distance" (S108). Furthermore, the CPU 101 substitutes the loop index i in the variable n (S108), and proceeds the process to step S109. If the distance D(Pc, P[i]) is not equal to or smaller than the variable "min_distance" (NO in S107), the CPU 101 proceeds the process to step S109. The CPU 101 adds "1" to the loop index i in step S109, and determines in step S110 whether or not comparison between the feature vector Pc of the processing target pixel and the representative feature vectors of all clusters is complete. If comparison with all the clusters is complete (YES in S110), the CPU 101 proceeds the process to step S111. If comparison with all the clusters is not complete yet (NO in S110), the CPU 101 proceeds the process to step S105 to repeat the processes.

In step S111, the CPU 101 compares the variable "min_distance" with a first distance threshold Td. If the variable "min_distance" is equal to or smaller than the first distance threshold (YES in S111), the CPU 101 proceeds the process to step S112. In step S112, the CPU 101 allocates the processing target pixel to a cluster C[n], and updates a representative feature vector P[n] of the cluster C[n]. Furthermore, the CPU 101 adds "1" to N[n] which represents the total number of pixels allocated to the cluster C[n], and then proceeds the process to step S114. If the variable "min_distance" is larger than the first distance threshold in step S111 (NO in S111), all clusters are distant from the feature vector of the processing target pixel. Hence, the CPU 101 defines a new cluster, and allocates the processing target pixel to the new cluster (S113). More specifically, the CPU 101 adds "1" to the number "num_cluster" of clusters in step S113. The CPU 101 sets the feature vector Pc of the processing target pixel to be a representative feature vector P[num_cluster] of the new cluster C[num_cluster]. Furthermore, the CPU 101 sets "1" as the number N[num_cluster] of pixels allocated to the new cluster C[num_cluster].

The CPU 101 then determines in step S114 whether or not the processing target pixel is located at the right end of an image. If the processing target pixel is located at the right end of the image (YES in S114), the CPU 101 proceeds the process to step S115. If the processing target pixel is not located at the right end of the image (NO in S114), the CPU 101 proceeds the process to step S118. In step S115, the CPU 101 adds "1" to the variable "line", and proceeds the process to step S116. The CPU 101 determines in step S116 whether or not a remainder obtained upon dividing the variable "line" by "L" is zero. If the remainder is zero (YES in S116), the CPU 101 proceeds the process to step S117. If the remainder is not zero (NO in S116), the CPU 101 proceeds the process to step S118. For example, when the number "L" of lines is "4", the process proceeds to step S118 every time processing for pixels for four lines is complete. In step S117, the CPU 101 executes processing for merging a cluster having a small number of allocated pixels (to be referred to as a small cluster hereinafter) to another cluster. Details of step S117 as a characteristic feature of this embodiment will be described later with reference to FIGS. 3A and 3B. If all pixels in image data have been processed (YES in S118), the CPU 101 ends the processing of the clustering processing unit 302. If pixels to be processed still remain (NO in S118), the CPU 101 proceeds the process to step S102 to select a subsequent pixel as a new processing target pixel. Note that the subsequent pixel is a right adjacent pixel of the processing target pixel when the processing target pixel is not located at the right end, and a pixel at the left end of the next line when the processing target pixel is located at the right end.

(Sequence Example of Small Cluster Merging Processing S117)

The small cluster merging processing in step S117 will be described below using the flowcharts exemplified in FIGS. 3A and 3B.

In step S201, the CPU 101 initializes the loop index i to "1". Furthermore, the CPU 101 initializes a variable "num_merged_cluster" that represents the total number of merged clusters to zero. In step S202, the CPU 101 acquires the number N[i] of pixels allocated to a cluster C[i]. In step S203, the CPU 101 compares the number N[i] of pixels with a pixel count threshold Tn. If the number N[i] of pixels is equal to or smaller than the pixel count threshold (YES in S203), the CPU 101 determines that the cluster C[i] is a small cluster, and proceeds the process to step S204. If the number N[i] of pixels is not equal to or smaller than the pixel count threshold (NO in S203), the CPU 101 proceeds the process to step S214. In this case, the pixel count threshold Tn is used to determine whether or not a processing target cluster is a small cluster, and its value is not limited in the present invention. In this embodiment, assume that Tn="1". Note that the pixel count threshold Tn may be decided according to the number of pixels of processing target image data. For example, Tn may be decided to be 1/100 of the number of pixels in the horizontal direction (line direction). In step S204, the CPU 101 acquires a representative feature vector P[i] of the small cluster C[i].

Steps S205 to S212 are processes for searching for a cluster having a representative feature vector nearest to the representative feature vector P[i] of the small cluster C[i]. In step S205, the CPU 101 initializes a loop index j to "1". Also, the CPU 101 initializes the variable "min_distance" that represents a minimum distance by the constant MAX_VAL. Furthermore, the CPU 101 initializes a variable n that represents a number of a cluster nearest to the representative feature vector P[i] of the small cluster C[i] to "1". The CPU 101 determines in step S206 whether or not the processing target cluster C[i] is not the same as a comparison target cluster C[j]. If these clusters are not the same (YES in S206), the CPU 101 proceeds the process to step S207. If these clusters are the same (NO in S206), the CPU 101 proceeds the process to step S211. In step S207, the CPU 101 acquires a representative feature vector P[j] of the comparison target cluster C[j]. In step S208, the CPU 101 calculates a distance D(P[i], P[j]) indicating a similarity between the representative feature vector P[i] of the small cluster C[i] and the representative feature vector P[j] of the comparison target cluster C[j]. If the distance D(P[i], P[j]) is equal to or smaller than "min_distance" (YES in S209), the CPU 101 substitutes the distance D(P[i], P[j]) in "min_distance" (S210). Furthermore, the CPU 101 substitutes the loop index j in the variable n (S210), and proceeds the process to step S211. If the distance D(P[i], P[j]) is not equal to or smaller than "min_distance" (NO in S209), the CPU 101 proceeds the process to step S211. The CPU 101 adds "1" to the loop index j in step S211, and determines in step S212 whether or not comparison of all clusters C[1] to C[num_cluster] with the representative feature vector of the small cluster C[i] is complete. If comparison of all the clusters is complete (YES in S212), the CPU 101 proceeds the process to step S213. If comparison of all the clusters is not complete yet (NO in S212), the CPU 101 proceeds the process to step S206.

In step S213, the CPU 101 executes processing for merging the small cluster C[i] to a cluster C[n]. More specifically, the CPU 101 updates a representative feature vector P[n] of the cluster C[n]. In this case, the updated representative feature vector P[n] is an average value of the representative feature vectors of the two clusters C[n] and C[i] to be merged, and is expressed by:

$$P[n]=(P[n] \times N[n]+P[i] \times N[i])/(N[n]+N[i])$$

Furthermore, the CPU 101 adds the number N[i] of pixels of the small cluster to the number N[n] of pixels of the cluster C[n]. Also, the CPU 101 updates the variable "num_merged_cluster" that represents the number of merged clusters. Then, the CPU 101 adds "1" to the loop index i in step S214. The CPU 101 checks in step S215 whether or not determination about a small cluster is complete for all the clusters. If determination is complete for all the clusters (YES in S215), the CPU 101 proceeds the process to step S216. If determination is not complete yet for all the clusters (NO in S215), the CPU 101 proceeds the process to step S202.

In step S216, since unused areas appear in an arrangement of cluster information as a result of the small cluster merging processing, the CPU 101 removes the unused areas from the arrangement by rearranging elements in the arrangement. More specifically, the CPU 101 rearranges representative feature vectors P[1 . . . i . . . num_cluster] and the numbers N[1 . . . i . . . num_cluster] of pixels. Then, the CPU 101 subtracts the number "num_merged_cluster" of merged clusters from the variable "num_cluster" that represents the number of clusters to update that variable to a new number "num_cluster" of clusters, thus ending the small cluster merging processing.

As described above, in the image processing method of this embodiment, a small cluster having a small number of allocated pixels is merged every time L lines have been processed (S114 to S117). Image data output from the document reading unit 300 includes noise components caused by an optical distortion of the scanner or dust attached to a glass surface. Also, a document itself to be read includes color variations around edges caused by anti-aliasing processing in association with, for example, characters. In the image processing method of this embodiment, every time processing for the predetermined number of pixels is complete, a cluster to which a small number of pixels that may be estimated as a noise component is allocated is merged with another cluster as needed, thereby reducing the number of clusters in the middle of clustering. Therefore, the number of times of calculations of distances between a feature vector of the processing target pixel and representative feature vectors of clusters (to be referred to as "distance calculation" hereinafter) can be reduced compared to the conventional Nearest Neighbor clustering method.

<Practical Example of Processing of Clustering Processing Unit 302 of First Embodiment>

Figure 4:
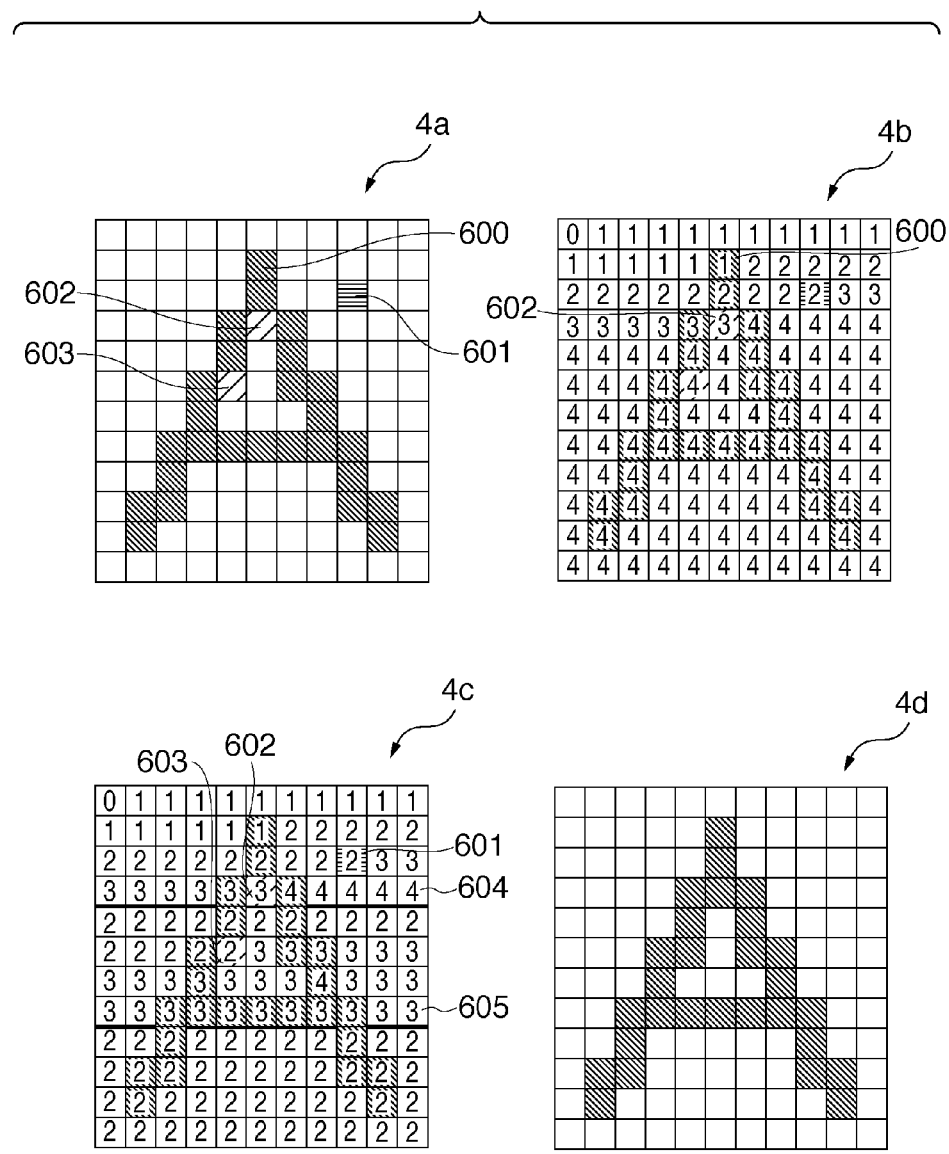
FIG. 4 is a view exemplifying the numbers of distance calculations in the image processing method according to the first embodiment.

A practical example of the processing of the clustering processing unit 302 will be described below using images exemplified in FIG. 4. An image 4a in FIG. 4, which includes 12 pixels in the vertical direction and 11 pixels in the horizontal direction, is segmented into regions by clustering. An image 4b in FIG. 4 exemplifies the numbers of distance calculations for respective pixels in the conventional Nearest Neighbor clustering method. An image 4c in FIG. 4 exemplifies the numbers of distance calculations for respective pixels, when small clusters are merged every four lines in this embodiment. In the conventional Nearest Neighbor clustering method, the number of distance calculations for each pixel is "1" until a pixel 600. However, every time a pixel farther from a feature vector of a defined cluster appears, the number of distance calculations increases. In the image 4a in FIG. 4, four distance calculations are required for each pixel after a pixel 602. Hence, in the conventional Nearest Neighbor clustering method, the accumulated total of the numbers of distance calculations for the entire image data amounts to "440".

On the other hand, in the image processing method of this embodiment, as indicated by the image 4c in FIG. 4, the numbers of distance calculations are the same as those in the conventional Nearest Neighbor clustering method until a pixel 604, but they are different for pixels located below the pixel 604. At the time of completion of processing for the pixel 604 which is located at the right end of the fourth line, a cluster (region #3) corresponding to a pixel 601 and a cluster (region #4) corresponding to a pixel 602 respectively have the number of pixels=1. Therefore, in step S203 of the flowcharts exemplified in FIGS. 3A and 3B, it is determined that these two clusters are small clusters. With the processes in steps S204 to S213, the cluster to which the pixel 601 is allocated is merged to a cluster corresponding to a region #1, and the cluster to which the pixel 602 is allocated is merged to a cluster corresponding to a region #2. Hence, in pixels of a line located below the pixel 604, the number of distance calculations per pixel is "2". At the time of completion of processing of a pixel 605 located at the right end of the eighth line, a cluster to which a pixel 603 is allocated is similarly merged to the cluster corresponding to the region #2. Hence, the accumulated total of the numbers of distance calculations for respective pixels in the entire image data amounts to "292". In the processing for merging clusters, distance calculations between representative feature vectors of clusters are made (S208). However, as shown in FIG. 4, one or two small clusters are to be merged every time four lines have been processed. Therefore, the number of times of calculation in the processing for merging clusters does not largely influence the accumulated total of the numbers of distance calculations.

As described above, since the image processing method of this embodiment can reduce the number of distance calculations of feature vectors of clusters, region segmentation faster than the conventional Nearest Neighbor clustering method can be implemented. Furthermore, the image processing method of this embodiment can remove noise components by merging small clusters every time processing for the predetermined number of pixels is complete. For example, as indicated by an image 4d in FIG. 4, pixels 601, 602, and 603 estimated as noise components are assigned to the regions #1 and #2, thus obtaining a visually satisfactory region segmentation result.

<Modification of First Embodiment>

Figure 3B:
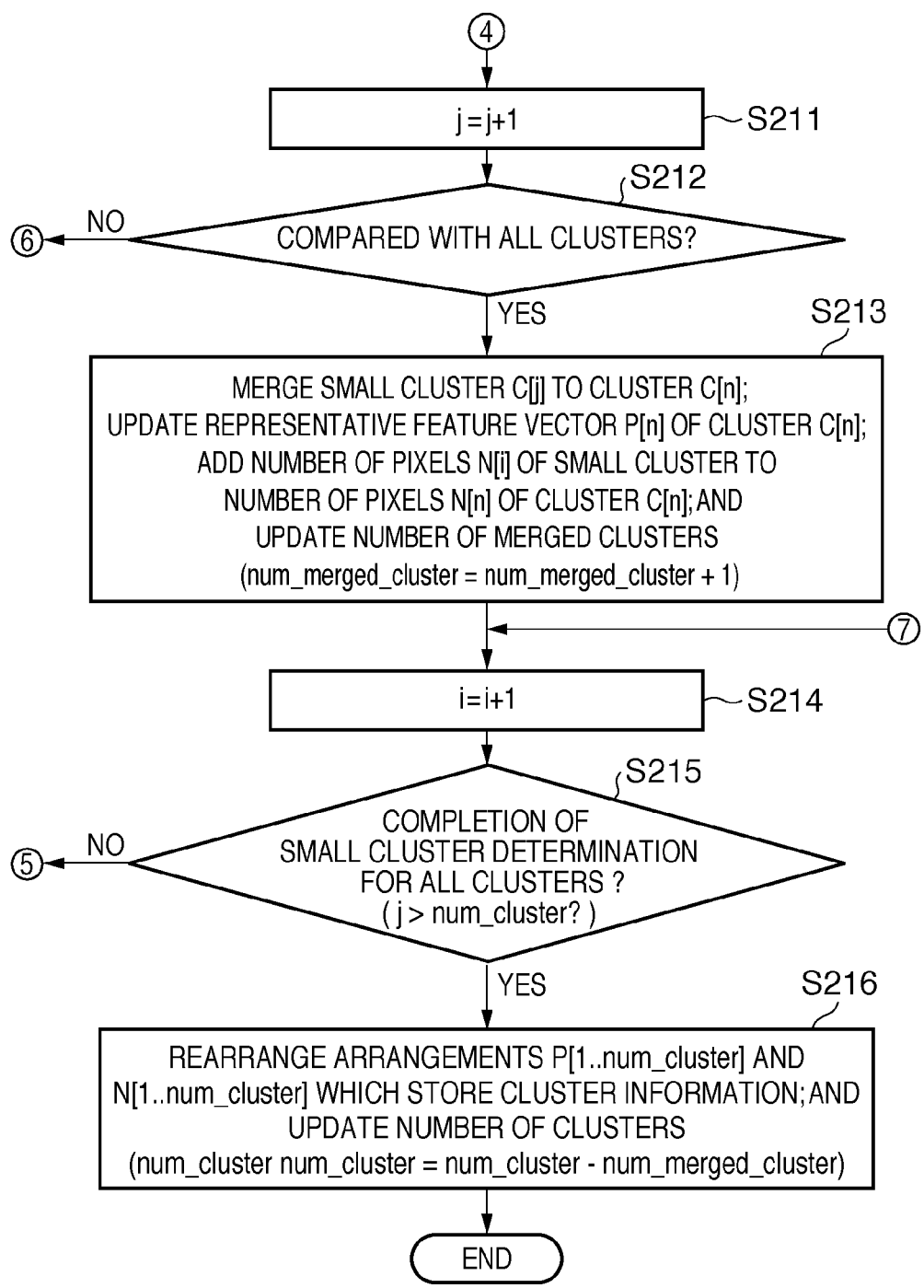
Figure 5:
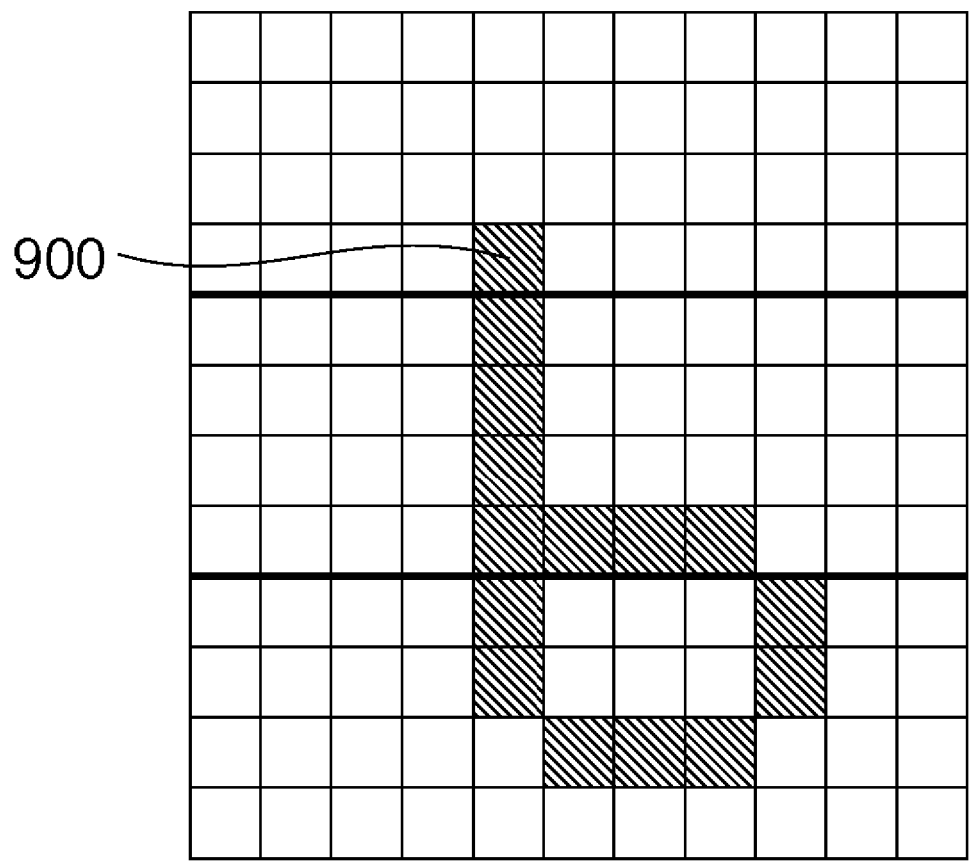
FIG. 5 is a view exemplifying a region segmentation result in another image processing method according to the first embodiment.

In the first embodiment, if the number N[i] of pixels of the cluster C[i] is equal to or smaller than the pixel count threshold Tn in step S203 in FIGS. 3A and 3B, it is determined that the cluster C[i] is a small cluster. However, the present invention is not limited to this. In this modification, in step S203 in FIGS. 3A and 3B, a vertical coordinate of a pixel, which is located in the lowermost line at the time of small cluster merging, of those which are allocated to the cluster C[i], is compared with the line counter "line". If that pixel is located at the same line, even when the number N[i] of pixels is equal to or smaller than the pixel count threshold Tn, the cluster C[i] is not determined as a merging target (NO in S203). With this processing, as exemplified in FIG. 5, a cluster, which corresponds to a pixel 900 and is connected in a direction perpendicular to the line direction, can be prevented from being erroneously determined as a small cluster, thus improving the accuracy of region segmentation. That is, upon completion of processing for the first four lines in FIG. 5, a cluster to which the pixel 900 is allocated includes only one allocated pixel. However, when the next four lines are processed, the number of pixels allocated to that cluster is likely to be increased. That is, when there are subsequent pixels, and when pixels for the next four lines are processed, a cluster may be determined not as a small cluster. Hence, a cluster including a pixel located at the lowermost line of the processed lines is excluded from a merging target.

In the first embodiment, after pixels as many as an integer multiple of the number of pixels per line are processed, the small cluster merging processing is executed at the right end of an image (S114). However, the present invention is not limited to this. Every time processing for the predetermined number of pixels is complete, the small cluster merging processing may be executed at a pixel position other than the right end of an image. In the first embodiment, a small cluster is merged to a cluster having the nearest distance between representative feature vectors. However, the present invention is not limited to this. A small cluster may be merged to a cluster to which a pixel located adjacent to a pixel allocated to the small cluster is allocated. With this processing, even when a pixel whose feature vector is considerably different from the representative feature vector of a cluster to which adjacent pixels are allocated exists like dust attached to the scanner, a region segmentation result having high image quality can be obtained. Furthermore, as the modification, when the number of clusters determined as small clusters in step S117 exceeds a threshold, an image may be compressed in a bitmap format. When the number of small clusters is extremely large, processing target image data may include a very large number of noise components. When such image data is converted into vector data, since the number of objects expressed by vector data increases, the data size is likely to increase. Therefore, in such case, since the processing target image is not suited to conversion into vector data, it is preferable to adaptively select a data conversion method according to the number of small clusters. In this case, when the number of clusters determined as small clusters in step S117 exceeds a small cluster count threshold, which is set in advance, the clustering processing is terminated.

[Second Embodiment]

<Processing Sequence Example of Clustering Processing Unit 302 of Second Embodiment>

Figure 6A:
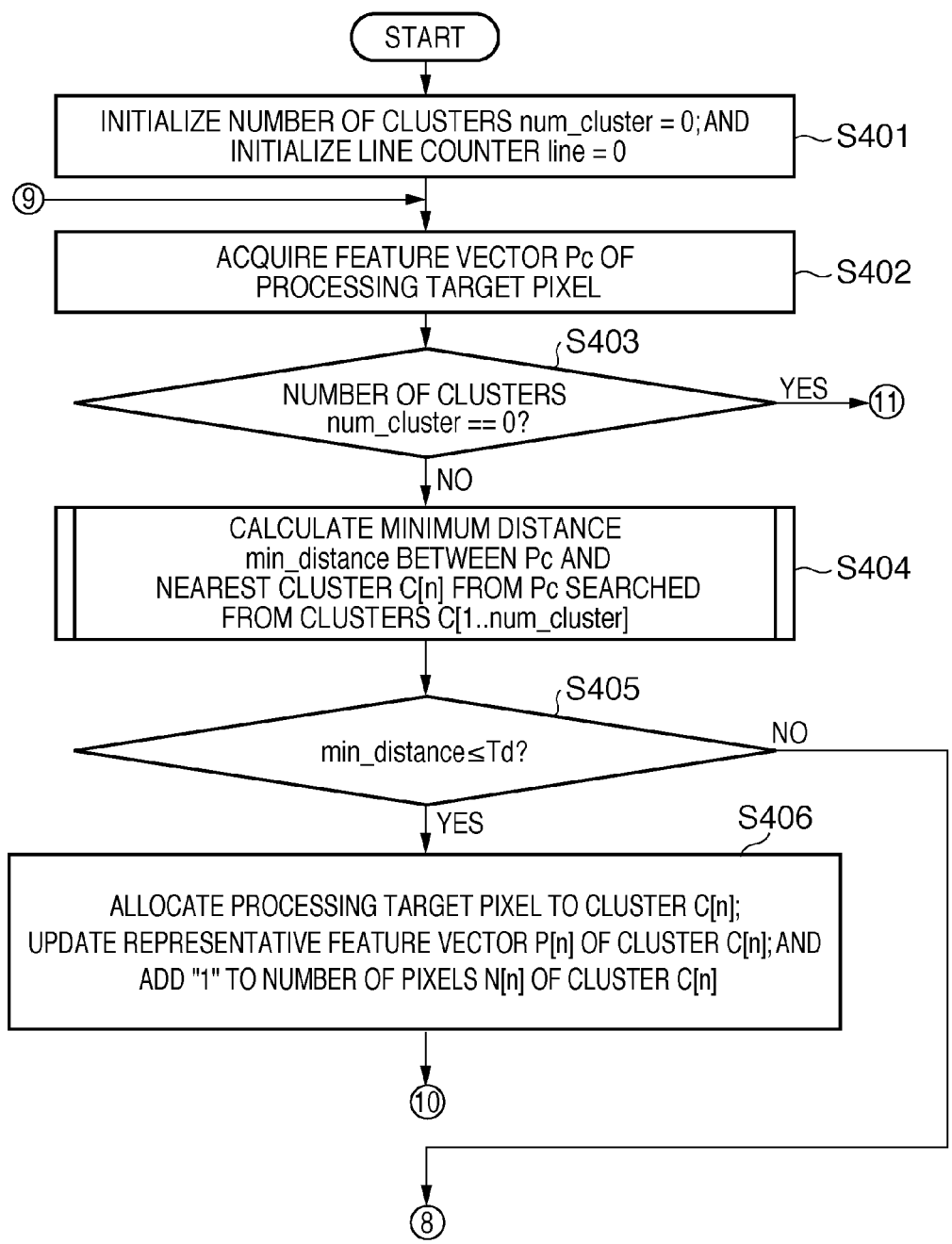
FIGS. 6A and 6B are flowcharts exemplifying a practical processing sequence of an image processing method according to the second embodiment.
Figure 6B:
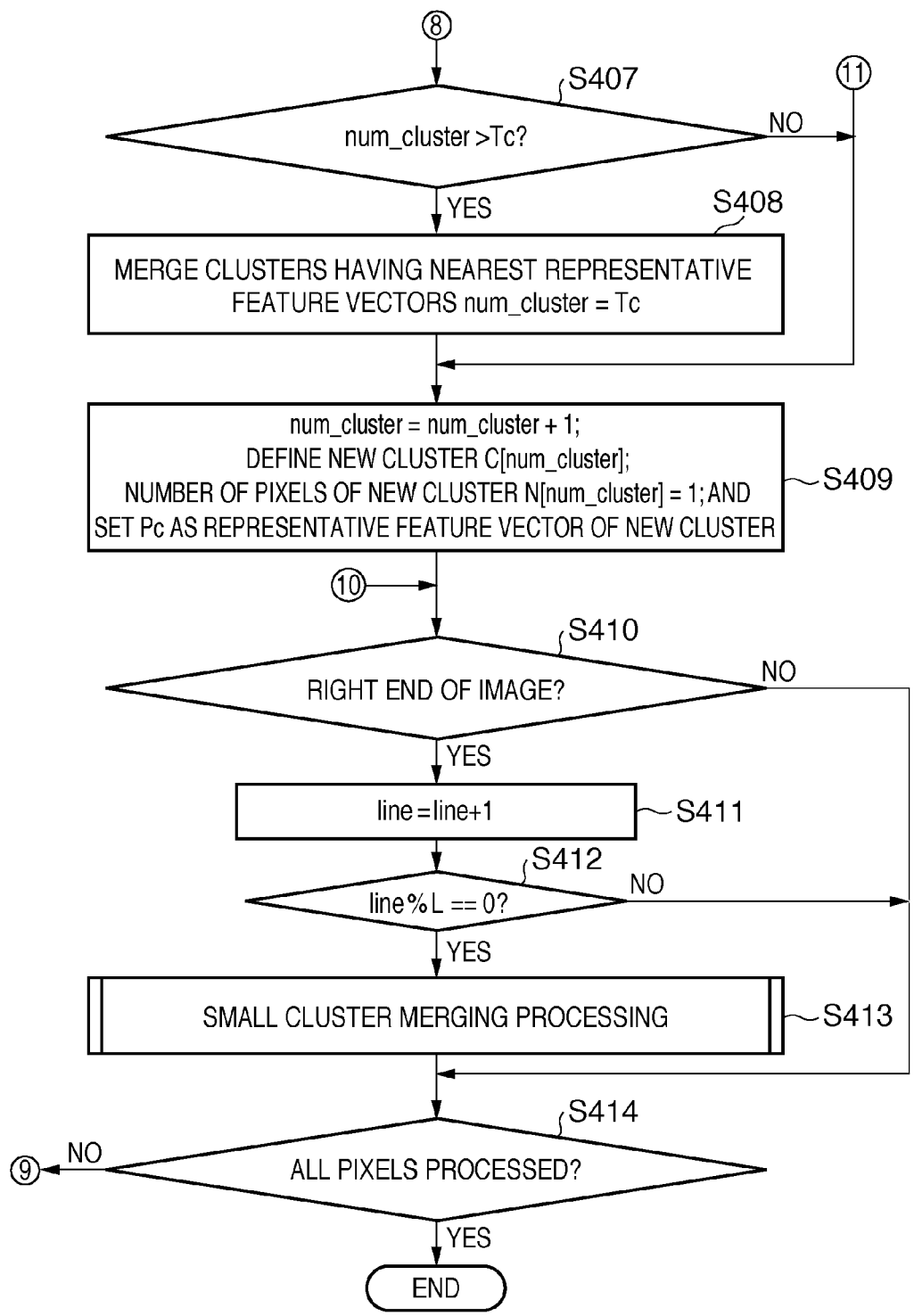

An image processing method according to the second embodiment of the present invention will be described below using the flowcharts shown in FIGS. 6A and 6B. The second embodiment limits the number of clusters to be generated in addition to the processing of the first embodiment.

The CPU 101 initializes, to zero, a variable "num_cluster" that represents the number of clusters, and a variable "line" that represents a line (vertical coordinate) where a processing target pixel is located (S401). The CPU 101 then acquires a feature vector Pc of the processing target pixel (S402). The CPU 101 then determines whether or not the number of clusters is zero (S403). If the number of clusters is zero (YES in S403), the CPU 101 proceeds the process to step S409. If the number of clusters is not zero (NO in S403), the CPU 101 proceeds the process to step S404. Step S404 is processing for calculating a minimum distance "min_distance" by searching defined clusters C[1] to C[num_cluster] for a cluster C[n] having a representative feature vector nearest to the feature vector of the processing target pixel. Since the sequence in step S404 is the same as the processes in steps S104 to S110 in the flowcharts exemplified in FIGS. 2A and 2B, which represent the processing of the first embodiment, a description thereof will not be repeated.

In step S405, the CPU 101 compares the minimum distance "min_distance" with a first distance threshold Td. If the minimum distance "min_distance" is equal to or smaller than the first distance threshold (YES in S405), the CPU 101 proceeds the process to step S406. If the minimum distance "min_distance" is not equal to or smaller than the first distance threshold (NO in S405), the CPU 101 proceeds the process to step S407. In step S406, the CPU 101 allocates the processing target pixel to a cluster C[n], and updates a representative feature vector P[n] of the cluster C[n]. Furthermore, the CPU 101 adds "1" to the total number N[n] of pixels allocated to the cluster C[n], and then proceeds the process to step S410. In step S407, the CPU 101 compares the total number "num_cluster" of clusters with a cluster count threshold Tc as a threshold for the total number of clusters. The value of the cluster count threshold Tc is not limited in the present invention. In this embodiment, assume that Tc="3". If the total number "num_cluster" of clusters is larger than the cluster count threshold (YES in S407), the CPU 101 proceeds the process to step S408. If the total number "num_cluster" of clusters is less than the cluster count threshold (NO in S407), the CPU 101 proceeds the process to step S409. In step S408, the CPU 101 merges clusters having the nearest representative feature vectors so as to suppress the total number "num_cluster" of clusters to be equal to or smaller than the cluster count threshold Tc. In step S409, the CPU 101 then defines a new cluster, and allocates the processing target pixel to the new cluster. More specifically, the CPU 101 adds "1" to the number "num_cluster" of clusters. The CPU 101 sets the feature vector Pc of the processing target pixel to be a representative feature vector P[num_cluster] of the new cluster C[num_cluster]. Furthermore, the CPU 101 sets "1" as the number N[num_cluster] of pixels allocated to the new cluster C[num_cluster]. Since steps S410 to 5413 are processes for merging a small cluster every L lines, and are the same as the processes in steps S114 to 5117 (FIGS. 2A and 2B and FIGS. 3A and 3B) of the first embodiment, a description thereof will not be repeated. After all the pixels in image data have been processed (YES in S414), the CPU 101 ends the processing of the clustering processing unit 302. If pixels to be processed still remain in the image data (NO in S414), the CPU 101 proceeds the process to step S402 to select the subsequent pixel as a processing target.

As described above, the image processing method of this embodiment merges a small cluster including a small number of allocated pixels every time L lines are processed (S410 to S413). When the number of defined clusters exceeds the cluster count threshold Tc, clusters having nearest representative feature vectors are merged (S407 and S408). With these processes, since the number of clusters is decreased during clustering processing, the number of distance calculations can be reduced compared to the conventional Nearest Neighbor clustering method.

<Practical Example of Processing of Clustering Processing Unit 302 of Second Embodiment>

A practical example of processing for generating a plurality of clusters by the clustering processing unit 302 of the second embodiment will be described below using images exemplified in FIG. 7. An image 7a in FIG. 7, which includes 13 pixels in the vertical direction and 6 pixels in the horizontal direction, is segmented into regions by clustering. An image 7b in FIG. 7 exemplifies the numbers of distance calculations for respective pixels in the conventional Nearest Neighbor clustering method. An image 7c in FIG. 7 exemplifies the numbers of distance calculations in a case in which processing for merging clusters having nearest representative feature vectors is executed when the number of defined clusters exceeds the cluster count threshold Tc, and processing for merging a small cluster is not executed. Note that "3" is set in the cluster count threshold Tc in this case. An image 7d in FIG. 7 exemplifies the numbers of distance calculations in the image processing method of the second embodiment. More specifically, the image 7d exemplifies the numbers of distance calculations in a case in which when the number of defined clusters exceeds the cluster count threshold Tc, clusters having nearest representative feature vectors are merged, and small clusters are merged every four lines.

In the conventional Nearest Neighbor clustering method, the number of distance calculations for each pixel is "1" until a pixel 700, but it increases every time a pixel farther from a feature vector of the defined cluster appears. Hence, in the conventional Nearest Neighbor clustering method, the accumulated total of the numbers of distance calculations in the entire image data amounts to "314". Upon merging clusters having nearest representative feature vectors when the number of defined clusters exceeds the cluster count threshold Tc, the number of clusters exceeds the cluster count threshold Tc=3 when a pixel 702 is processed in the image 7c in FIG. 7. In this case, a cluster corresponding to a region #3 is merged to a cluster corresponding to a region #1 to suppress the number of clusters to "3". Since the number of clusters similarly exceeds the cluster count threshold Tc when a pixel 704 is processed, a cluster corresponding to a region #4 (pixel 701) is merged to a cluster corresponding to a region #2. Hence, in the image 7c in FIG. 7, the accumulated total of the numbers of distance calculations in the entire image data amounts to "214".

In the second embodiment, since small clusters are also merged every predetermined number of lines, the number of distance calculations can be further reduced. In the image 7d in FIG. 7, since the numbers of pixels of clusters corresponding to regions #3 and #4 are respectively "1" at the time of completion of processing of a pixel 703, these two clusters are merged to a cluster having the nearest distance. Therefore, since the number of clusters which are to undergo a distance calculation is "2" in a line below the pixel 703, the number of distance calculations per pixel is "2" until a pixel 704. Therefore, the accumulated total of the numbers of distance calculations in the entire image data amounts to "194".

As described above, the image processing method of this embodiment allows faster region segmentation than the conventional Nearest Neighbor clustering method.

[Third Embodiment]

<Processing Sequence Example of Clustering Processing Unit 302 of Third Embodiment>

Figure 8A:
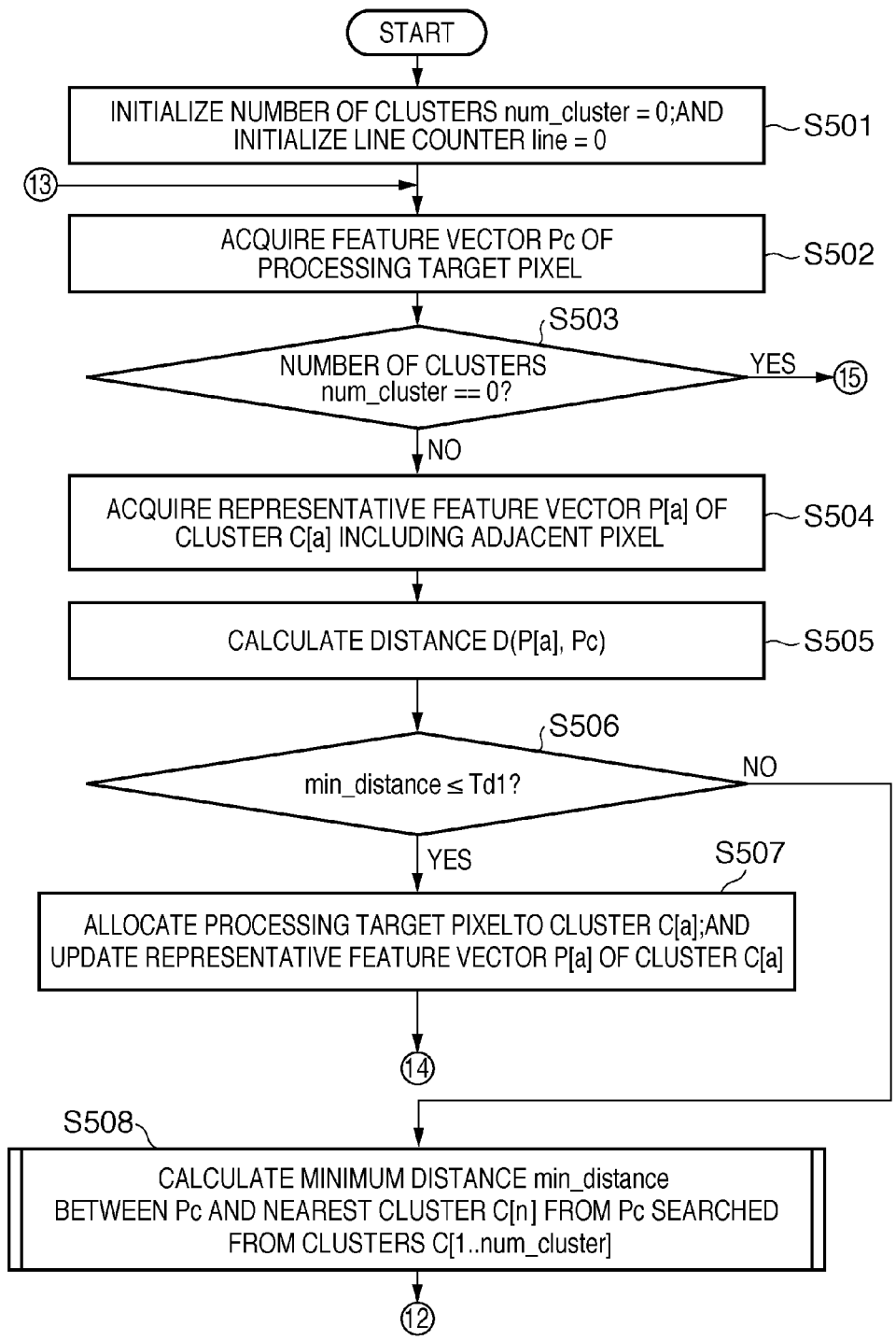
FIGS. 8A and 8B are flowcharts exemplifying a practical processing sequence of an image processing method according to the third embodiment.
Figure 8B:
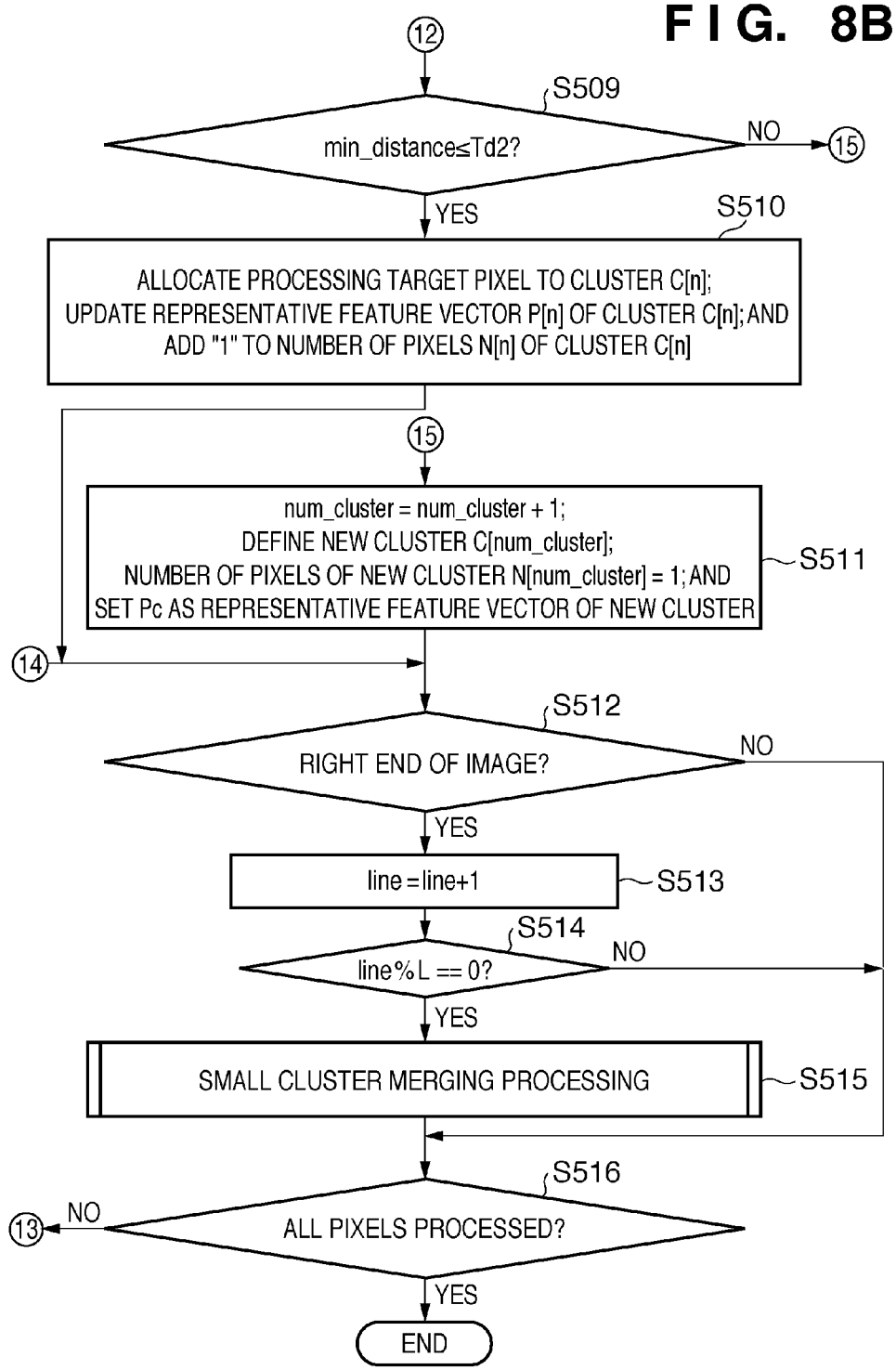

An image processing method according to the third embodiment of the present invention will be described below using the flowcharts shown in FIGS. 8A and 8B. The third embodiment preferentially applies cluster merging processing to a cluster including a pixel located adjacent to a processing target pixel in addition to the processing of the first embodiment. The CPU 101 initializes, to zero, a variable "num_cluster" that represents the number of clusters, and a variable "line" that represents a line (vertical coordinate) where a processing target pixel is located (S501). The CPU 101 then acquires a feature vector Pc of the processing target pixel (S502). The CPU 101 then determines whether or not the number of clusters is zero (S503). If the number of clusters is zero (YES in S503), the CPU 101 proceeds the process to step S511. If the number of clusters is not zero (NO in S503), the CPU 101 proceeds the process to step S504.

In step S504, the CPU 101 acquires a representative feature vector P[a] of a cluster C[a] to which a pixel located adjacent to the processing target pixel (adjacent pixel) is allocated. Note that the adjacent pixel is that which is allocated on, for example, the left side of the processing target pixel. However, the present invention is not limited to this, and the adjacent pixel may be that located, for example, above the processing target pixel. The CPU 101 calculates a distance D(P[a], Pc) between the representative feature vector P[a] and feature vector Pc in step S505, and determines in step S506 if the distance D(P[a], Pc) is equal to or smaller than a second distance threshold Td1. If the distance D(P[a], Pc) is equal to or smaller than the second distance threshold (YES in S506), the CPU 101 proceeds the process to step S507. In step S507, the CPU 101 allocates the processing target pixel to the adjacent cluster C[a], updates the representative feature vector P[a] of the cluster C[a], and proceeds the process to step S512. On the other hand, if the distance D(P[a], Pc) is not equal to or smaller than the second distance threshold (NO in S506), the CPU 101 proceeds the process to step S508. Step S508 is processing for calculating a minimum distance "min_distance" by searching defined clusters C[1] to C[num_cluster] for a cluster C[n] having a representative feature vector nearest to the feature vector Pc of the processing target pixel. Since the processing in step S508 is the same as the processes in steps S104 to S110 in the flowcharts exemplified in FIGS. 2A and 2B, which represent the processing of the first embodiment, a description thereof will not be repeated. The CPU 101 determines in step S509 whether or not the minimum distance "min_distance" is equal to or smaller than a first distance threshold Td2. If the minimum distance "min_distance" is equal to or smaller than the first distance threshold Td2 (YES in S509), the CPU 101 proceeds the process to step S510. If the minimum distance "min_distance" is not equal to or smaller than the first distance threshold Td2 (NO in S509), the CPU 101 proceeds the process to step S511. In step S510, the CPU 101 allocates the processing target pixel to the cluster C[n], and updates the representative feature vector P[n] of the cluster C[n]. Furthermore, the CPU 101 adds "1" to N[n] that represents the total number of pixels allocated to the cluster C[n], and then proceeds the process to step S512. In step S511, the CPU 101 defines a new cluster, and allocates the processing target pixel to the new cluster. More specifically, the CPU 101 adds "1" to the number "num_cluster" of clusters. The CPU 101 sets the feature vector Pc of the processing target pixel to be a representative feature vector P[num_cluster] of the new cluster C[num_cluster]. Furthermore, the CPU 101 sets "1" as the number N[num_cluster] of pixels allocated to the new cluster C[num_cluster]. Since steps S512 to S515 are processes for merging a small cluster every L lines and are the same as the processes in steps S114 to S117 (FIGS. 2A and 2B and FIGS. 3A and 3B) of the first embodiment, a description thereof will not be repeated. After all the pixels in image data have been processed (YES in S516), the CPU 101 ends the processing of the clustering processing unit 302. If pixels to be processed still remain in the image data (NO in S516), the CPU 101 proceeds the process to step S502 to select the subsequent pixel as a processing target.

As described above, the image processing method of this embodiment merges a small cluster including a small number of allocated pixels every time L lines are processed (S512 to S515), thereby reducing the number of clusters. Also, a distance from a feature vector of a cluster to which a pixel located adjacent to (for example, on the left side of) the processing target pixel is allocated is calculated first (S504 and S505). If the distance is small, the processing target pixel is allocated to that cluster, and comparison of a representative feature vector of another cluster is skipped (S506 and S507). Therefore, the number of distance calculations can be reduced compared to the conventional Nearest Neighbor clustering method.

<Practical Example of Processing of Clustering Processing Unit 302 of Third Embodiment>

Figure 9:
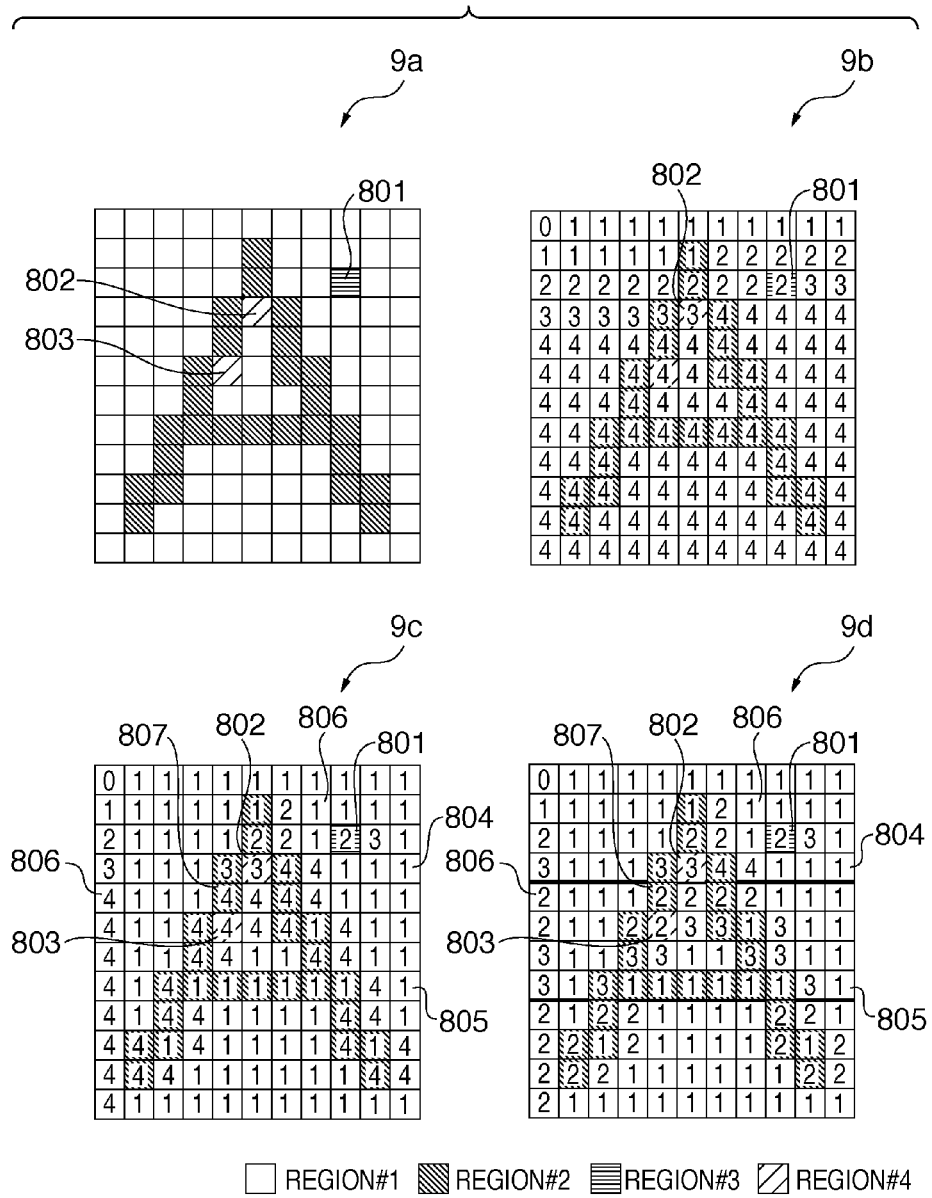
FIG. 9 is a view exemplifying the numbers of distance calculations in the image processing method according to the third embodiment.

A practical example of processing for generating a plurality of clusters by the clustering processing unit 302 of the third embodiment will be described below using images exemplified in FIG. 9. An image 9a in FIG. 9, which includes 12 pixels in the vertical direction and 11 pixels in the horizontal direction, is segmented into regions by clustering. Note that the image 9a in FIG. 9 is the same as the image 4a in FIG. 4 used in the description of the first embodiment. An image 9b in FIG. 9 exemplifies the numbers of distance calculations for respective pixels in the conventional Nearest Neighbor clustering method. An image 9c in FIG. 9 exemplifies the numbers of distance calculations in a case in which comparison with a representative feature vector of a cluster to which a left adjacent pixel is allocated is made (S504 to S507), and processing for merging a small cluster is not executed. An image 9d in FIG. 9 exemplifies the numbers of distance calculations for respective pixels in a case in which comparison with a representative feature vector of a cluster to which a left adjacent pixel is allocated is made, and a small cluster is merged every four lines in the third embodiment.

In the conventional Nearest Neighbor clustering method, the number of distance calculations for each pixel is "1" until a pixel 801, but it increases every time a pixel farther from a feature vector of the defined cluster appears. Hence, in the conventional Nearest Neighbor clustering method, the accumulated total of the numbers of distance calculations in the entire image data amounts to "440". Upon making comparison with a representative feature vector of a cluster to which a left adjacent pixel is allocated (S504 to S507), when the distance from the representative feature vector of the cluster to which the left adjacent pixel is allocated is small, the number of distance calculations is "1". For example, in the image 9c in FIG. 9, since a pixel 806 is close to a feature vector of a cluster (corresponding to a region #1) to which the left adjacent pixel is allocated, the number of distance calculations is "1". The accumulated total of the numbers of distance calculations in the entire image data amounts to "255". Furthermore, when a small cluster is merged, the number of distance calculations can be reduced even when the feature vector of the processing target pixel is not close to the representative feature vector of a cluster to which the left adjacent pixel is allocated or even when the processing target pixel is that at the left end of the image. In the image 9d in FIG. 9, since the pixel 806 is located at the left end of the image, it cannot be compared with a cluster including the left adjacent pixel. However, at the time of completion of processing of a pixel 804, since regions #3 and #4 corresponding to small clusters are respectively merged to regions #1 and #2, the number of clusters which are to undergo distance calculations is "2". Therefore, only two distance calculations are required for the pixel 804. Also, since a feature vector of a pixel 807 is not close to the representative feature vector of a cluster to which the left adjacent pixel is allocated, it undergoes distance calculations with all the clusters. However, since the number of clusters is reduced to "2" as a result of merging the small clusters, as described above, only two distance calculations are required. The accumulated total of the numbers of distance calculations in the entire image data amounts to "200".

As described above, the image processing method of this embodiment allows faster region segmentation than the conventional Nearest Neighbor clustering method.

<Other Embodiments>

Note that other embodiments can be implemented by combining the first to third embodiments, and are included in the present invention.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-174736, filed on Jul. 27, 2009, which is hereby incorporated by reference herein in its entirety.

What is claimed is:

1. A method of processing an image by segmenting the image into a plurality of clusters, comprising:

a cluster generation step of (a) allocating, when a distance between a feature vector of a processing target pixel that is selected from the image sequentially and a representative feature vector of a cluster that has the nearest representative feature vector to the feature vector of the processing target pixel in a plurality of pre-defined clusters is not more than a first distance threshold, the processing target pixel to the cluster which has the nearest representative feature vector to the feature vector of the processing target pixel in the plurality of pre-defined clusters, and, (b) when the distance between the feature vector of the processing target pixel and the representative feature vector of the cluster which has the nearest representative feature vector to the feature vector of the processing target pixel in the plurality of pre-defined clusters is more than the first distance threshold, defining a new cluster and allocating the processing target pixel to the new defined cluster; and a cluster merging step of merging, after said cluster generation step has been performed on a predetermined number of processing target pixels, a small cluster to a cluster having the nearest representative feature vector to a representative feature vector of the small cluster in the plurality of pre-defined clusters, wherein the small cluster is a cluster of which a number of allocated pixels is not more than a pixel count threshold.

2. The method according to claim 1, wherein said cluster generation step includes a cluster number limiting step of merging clusters having near representative feature vectors when the number of pre-defined clusters exceeds a cluster count threshold.

3. The method according to claim 1, wherein in said cluster generation step, when a distance between the feature vector of the processing target pixel and a representative feature vector of a cluster to which a pixel located adjacent to the processing target pixel is allocated is not more than a second distance threshold, the processing target pixel is allocated to the adjacent cluster.

4. The method according to claim 1, wherein the predetermined number of processing target pixels is an integer multiple of the number of pixels in a line direction.

5. The method according to claim 4, wherein in said cluster merging step, even when the number of pixels allocated to a cluster is not more than the pixel count threshold, when pixels allocated to the cluster include a pixel located in a lowermost line of processed lines, that cluster is not handled as a small cluster.

6. The method according to claim 1, wherein in said cluster merging step, the small cluster is merged to a cluster to which a pixel located adjacent to a pixel allocated to the small cluster is allocated.

7. The method according to claim 1, wherein when the number of small clusters exceeds a small cluster count threshold, the processing for segmenting image data into a plurality of clusters in said image processing method is terminated.

8. A computer-readable storage medium which stores a program causing a computer to serve as:

a cluster generation unit configured to (a) allocate, when a distance between a feature vector of a processing target pixel that is selected from the image sequentially and a representative feature vector of a cluster that has the nearest representative feature vector to the feature vector of the processing target pixel in a plurality of pre-defined clusters is not more than a first distance threshold, the processing target pixel to the cluster which has the nearest representative feature vector to the feature vector of the processing target pixel in the plurality of pre-defined clusters, and, (b) to define, when the distance between the feature vector of the processing target pixel and the representative feature vector of the cluster which has the nearest representative feature vector to the feature vector of the processing target pixel in the plurality of pre-defined clusters is more than the first distance threshold, a new cluster and to allocate the processing target pixel to the new defined cluster; and a cluster merging unit configured to merge, after said cluster generation step has been performed on a predetermined number of processing target pixels, a small cluster to a cluster having the nearest representative feature vector to a representative feature vector of the small cluster in the plurality of pre-defined clusters, wherein the small cluster is a cluster of which a number of allocated pixels is not more than a pixel count threshold.

9. An image processing apparatus for processing an image by segmenting the image into a plurality of clusters, comprising:

a cluster generation unit configured to (a) allocate, when a distance between a feature vector of a processing target pixel that is selected from the image sequentially and a representative feature vector of a cluster that has the nearest representative feature vector to the feature vector of the processing target pixel in a plurality of pre-defined clusters is not more than a first distance threshold, the processing target pixel to the cluster which has the nearest representative feature vector to the feature vector of the processing target pixel in the plurality of pre-defined clusters, and, (b) to define, when the distance between the feature vector of the processing target pixel and the representative feature vector of the cluster which has the nearest representative feature vector to the feature vector of the processing target pixel in the plurality of pre-defined clusters is more than the first distance threshold, a new cluster and to allocate the processing target pixel to the new defined cluster; and a cluster merging unit configured to merge, after said cluster generation step has been performed on a predetermined number of processing target pixels, a small cluster to a cluster having the nearest representative feature vector to a representative feature vector of the small cluster in the plurality of pre-defined clusters, wherein the small cluster is a cluster of which a number of allocated pixels is not more than a pixel count threshold.

10. The apparatus according to claim 9, wherein said cluster generation unit includes a cluster number limiting unit configured to merge clusters having near representative feature vectors when the number of pre-defined clusters exceeds a cluster count threshold.

11. The apparatus according to claim 9, wherein when a distance between the feature vector of the processing target pixel and a representative feature vector of a cluster to which a pixel located adjacent to the processing target pixel is allocated is not more than a second distance threshold, said cluster generation unit allocates the processing target pixel to the adjacent cluster.

12. The apparatus according to claim 9, wherein the predetermined number of processing target pixels is an integer multiple of the number of pixels in a line direction.

13. The apparatus according to claim 12, wherein even when the number of pixels allocated to a cluster is not more than the pixel count threshold, when pixels allocated to the cluster include a pixel located in a lowermost line of processed lines, said cluster merging unit does not handle that cluster as a small cluster.

14. The apparatus according to claim 9, wherein said cluster merging unit merges the small cluster to a cluster to which a pixel located adjacent to a pixel allocated to the small cluster is allocated.

15. The apparatus according to claim 9, wherein when the number of small clusters exceeds a small cluster count threshold, the processing for segmenting image data into a plurality of clusters by said image processing apparatus is terminated.

* * * * *